US009719542B2

(12) United States Patent
Cappelle et al.

(10) Patent No.: US 9,719,542 B2
(45) Date of Patent: Aug. 1, 2017

(54) COMPOSED ELEMENT AND CORNER CONNECTION APPLIED HEREWITH

(75) Inventors: Mark Cappelle, Staden (BE); Luc Deman, Izegem (BE)

(73) Assignee: UNILIN, BVBA, Wielsbeke (BE)

( * ) Notice: Subject to any disclaimer, the term of this patent is extended or adjusted under 35 U.S.C. 154(b) by 999 days.

(21) Appl. No.: 13/701,327

(22) PCT Filed: May 23, 2011

(86) PCT No.: PCT/IB2011/052240
§ 371 (c)(1),
(2), (4) Date: Mar. 11, 2013

(87) PCT Pub. No.: WO2011/151758
PCT Pub. Date: Dec. 8, 2011

(65) Prior Publication Data
US 2013/0170904 A1    Jul. 4, 2013

Related U.S. Application Data

(63) Continuation of application No. PCT/IB2011/051276, filed on Mar. 25, 2011.
(Continued)

(30) Foreign Application Priority Data

Jun. 3, 2010  (BE) .................................. 2010/0341
Feb. 17, 2011  (BE) .................................. 2011/0106

(51) Int. Cl.
*F16B 12/44*    (2006.01)
*A47B 47/04*    (2006.01)
(Continued)

(52) U.S. Cl.
CPC ............ *F16B 12/44* (2013.01); *A47B 47/042* (2013.01); *F16B 5/00* (2013.01); *F16B 5/0016* (2013.01);
(Continued)

(58) Field of Classification Search
CPC .............. A47B 47/0075; A47B 47/042; A47B 2230/0074; A47B 2230/0077;
(Continued)

(56) References Cited

U.S. PATENT DOCUMENTS 242,026 A    5/1881  O'Connor
316,176 A    4/1885  Ransom
(Continued)

FOREIGN PATENT DOCUMENTS

BE    465593 A    5/1946
BE    740 678 A   4/1970
(Continued)

OTHER PUBLICATIONS

International Search Report and Written Opinion issued in for PCT/IB2011/052240, dated Apr. 10, 2012.
(Continued)

*Primary Examiner* — Michael P Ferguson
(74) *Attorney, Agent, or Firm* — Workman Nydegger

(57) ABSTRACT

A composed element includes at least two panel-shaped elements, such as a locking tongue and groove connection, that are arranged to be coupled to each other at an angle, either directly or indirectly by means of an intermediate piece. The connection includes, at least at one of the panel-shaped elements, a tongue or groove, cooperable with a groove or tongue provided on the other panel-shaped element or on the intermediate piece. The tongue includes a split tongue, with at least a first part and a second part, and a slit located therebetween. A locking part is located at the
(Continued)

outer side of at least said first part wherein the slit, seen in cross-section of the tongue, defines at least one side, the course of which, seen in cross-section, deviates from the main direction belonging to the tongue.

15 Claims, 14 Drawing Sheets

Related U.S. Application Data

(60) Provisional application No. 61/468,902, filed on Mar. 29, 2011.

(51) Int. Cl.
*F16B 5/00* (2006.01)
*F16B 12/12* (2006.01)

(52) U.S. Cl.
CPC ....... *F16B 12/125* (2013.01); *Y10T 403/7094* (2015.01)

(58) Field of Classification Search
CPC ........... A47B 2230/0081; F16B 12/125; F16B 2012/046; F16B 5/0012; F16B 5/0016; E04B 1/38; Y10T 403/7094
See application file for complete search history.

(56) References Cited

U.S. PATENT DOCUMENTS

| | | |
|---|---|---|
| 325,049 A | 8/1885 | Brolaski |
| 372,694 A | 11/1887 | Mergott |
| 443,271 A | 12/1890 | Dumas |
| 517,348 A | 3/1894 | Linderman |
| 634,581 A | 10/1899 | Miller |
| 637,212 A | 11/1899 | McCune |
| 653,514 A | 7/1900 | Kasschau |
| 671,954 A * | 4/1901 | Eaton ............................ 403/381 |
| 786,940 A | 4/1905 | Amsden |
| 861,911 A | 7/1907 | Stewart |
| 873,496 A | 12/1907 | Bryant |
| 881,673 A | 3/1908 | Ellison |
| 1,032,674 A | 7/1912 | Holland |
| 1,070,572 A | 8/1913 | Wyckoff |
| 1,159,229 A | 11/1915 | Keith |
| 1,194,636 A | 8/1916 | Joy |
| 1,436,858 A | 11/1922 | Burhen |
| 1,468,786 A | 9/1923 | Knechtel |
| 1,533,099 A | 4/1925 | Carroll |
| 1,534,468 A | 4/1925 | Shea, Jr. |
| 1,743,492 A | 1/1930 | Sipe |
| 1,922,994 A | 8/1933 | Voigt |
| 1,954,242 A | 4/1934 | Heppenstall |
| 2,002,228 A | 5/1935 | Meyercord et al. |
| 2,065,133 A | 12/1936 | Heppenstall |
| 2,116,584 A | 5/1938 | Shelby |
| 2,362,904 A | 11/1944 | Kramer |
| 2,453,918 A | 11/1948 | Jansen |
| 2,496,184 A | 1/1950 | Von Canon |
| 2,551,775 A * | 5/1951 | Von Canon ..................... 217/65 |
| 2,607,375 A | 8/1952 | Gillespie et al. |
| 2,681,483 A | 6/1954 | Morawetz |
| 2,732,706 A | 1/1956 | Friedman |
| 2,801,895 A | 8/1957 | Gass |
| 2,863,185 A | 12/1958 | Riedi |
| 2,872,712 A | 2/1959 | Brown et al. |
| 2,981,669 A | 4/1961 | Brand et al. |
| 3,021,187 A | 2/1962 | Mitchell |
| 3,078,888 A | 2/1963 | Bruemmer |
| 3,090,086 A | 5/1963 | Fata |
| 3,195,968 A | 7/1965 | Freeman |
| 3,284,152 A | 11/1966 | Schorghuber |
| 3,325,585 A | 6/1967 | Brenneman |
| 3,347,610 A | 10/1967 | Pilliod |
| 3,378,958 A | 4/1968 | Parks et al. |
| 3,410,441 A | 11/1968 | Rhyne |
| 3,526,071 A | 9/1970 | Watanabe |
| 3,539,425 A | 11/1970 | Marburg |
| 3,547,171 A | 12/1970 | Jacumin |
| 3,664,011 A | 5/1972 | Labastrou |
| 3,722,971 A | 3/1973 | Zeischegg |
| 3,745,736 A | 7/1973 | Fischer et al. |
| 3,760,547 A | 9/1973 | Brenneman |
| 3,885,845 A | 5/1975 | Krieks |
| 3,902,291 A | 9/1975 | Zucht |
| 3,933,401 A | 1/1976 | Lampe et al. |
| 3,950,915 A | 4/1976 | Cole |
| 4,012,090 A | 3/1977 | Pfeifer et al. |
| 4,012,155 A | 3/1977 | Morris |
| 4,019,298 A | 4/1977 | Johnson, IV |
| 4,025,216 A | 5/1977 | Hives |
| 4,037,380 A | 7/1977 | Pollock |
| 4,047,777 A | 9/1977 | Pfeifer et al. |
| 4,089,614 A | 5/1978 | Harley |
| 4,099,887 A | 7/1978 | MacKenroth |
| 4,110,946 A | 9/1978 | Louther, Jr. |
| 4,112,986 A | 9/1978 | Strange et al. |
| 4,116,513 A | 9/1978 | Ullman, Jr. |
| RE30,154 E | 11/1979 | Jarvis |
| 4,195,462 A | 4/1980 | Keller et al. |
| 4,206,956 A | 6/1980 | Lydmar |
| 4,279,455 A | 7/1981 | Santo |
| 4,391,008 A | 7/1983 | Yamaoka et al. |
| 4,416,097 A | 11/1983 | Weir |
| 4,422,488 A | 12/1983 | Lacroix et al. |
| 4,462,647 A | 7/1984 | Key |
| 4,466,675 A | 8/1984 | Ferdinand et al. |
| 4,471,822 A | 9/1984 | Griganavicius |
| 4,514,104 A * | 4/1985 | Taylor et al. .................. 403/14 |
| 4,640,437 A | 2/1987 | Weingartner |
| 4,651,651 A | 3/1987 | Sheffer |
| 4,750,794 A | 6/1988 | Vegh |
| 4,758,056 A | 7/1988 | Buck et al. |
| 4,800,821 A | 1/1989 | Nook et al. |
| 4,832,421 A | 5/1989 | Shoffner |
| 4,884,854 A | 12/1989 | Joffe |
| 4,886,326 A | 12/1989 | Kuzyk |
| 4,888,933 A | 12/1989 | Guomundsson et al. |
| 4,909,581 A | 3/1990 | Haheeb |
| 4,966,421 A | 10/1990 | Mengel |
| 4,974,389 A * | 12/1990 | Onysko et al. ................. 52/837 |
| 4,984,929 A | 1/1991 | Rock et al. |
| 4,996,817 A | 3/1991 | Nelson |
| 5,148,850 A | 9/1992 | Urbanick |
| 5,247,773 A | 9/1993 | Weir |
| 5,267,425 A | 12/1993 | Onysko et al. |
| 5,295,341 A | 3/1994 | Kajiwara |
| 5,323,584 A | 6/1994 | Scarlett |
| 5,348,778 A | 9/1994 | Knipp et al. |
| 5,368,380 A | 11/1994 | Mottmiller et al. |
| 5,454,331 A | 10/1995 | Green |
| 5,475,960 A * | 12/1995 | Lindal ............. 52/478 |
| 5,499,886 A | 3/1996 | Short et al. |
| 5,527,103 A | 6/1996 | Pittman |
| 5,548,937 A | 8/1996 | Shimonohara |
| 5,555,980 A | 9/1996 | Johnston et al. |
| 5,597,221 A | 1/1997 | Grieser et al. |
| 5,605,389 A | 2/1997 | Kelly et al. |
| 5,611,637 A | 3/1997 | Brustle et al. |
| 5,647,181 A | 7/1997 | Hunts |
| 5,658,086 A | 8/1997 | Brokaw et al. |
| 5,662,399 A | 9/1997 | Henkel et al. |
| 5,803,561 A | 9/1998 | Puehlhorn |
| 5,893,617 A | 4/1999 | Lee |
| 5,899,251 A | 5/1999 | Turner |
| 5,911,180 A | 6/1999 | Mullens |
| 5,970,675 A | 10/1999 | Schray |
| 6,045,290 A | 4/2000 | Nocievski |
| 6,086,995 A | 7/2000 | Smith |
| 6,309,039 B1 | 10/2001 | Park et al. |
| 6,357,194 B1 | 3/2002 | Jones, Jr. |
| 6,413,007 B1 | 7/2002 | Lambright |
| 6,502,002 B2 | 12/2002 | Susnjara et al. |

(56) References Cited

U.S. PATENT DOCUMENTS

| | | |
|---|---|---|
| 6,553,724 B1 | 4/2003 | Bigler |
| 6,820,950 B1 | 11/2004 | Sun |
| 6,827,028 B1 | 12/2004 | Callaway |
| 6,874,291 B1 | 4/2005 | Weber |
| 7,021,019 B2 | 4/2006 | Knauseder |
| 7,152,383 B1 | 12/2006 | Wilkinson, Jr. et al. |
| 7,255,236 B1 | 8/2007 | Sauder et al. |
| 7,451,535 B2 | 11/2008 | Wells et al. |
| 7,484,337 B2 | 2/2009 | Hecht |
| 7,634,884 B2 | 12/2009 | Pervan et al. |
| 7,637,068 B2 | 12/2009 | Pervan |
| 7,641,414 B1 | 1/2010 | Joyce |
| 7,654,055 B2 | 2/2010 | Ricker |
| 7,726,088 B2 | 6/2010 | Muehlebach |
| 7,841,145 B2 | 11/2010 | Pervan et al. |
| 7,866,110 B2 | 1/2011 | Pervan |
| 7,950,755 B2 | 5/2011 | Vardon |
| 7,980,039 B2 | 7/2011 | Groeke et al. |
| 7,997,044 B2 | 8/2011 | Green et al. |
| 8,001,910 B2 | 8/2011 | Yee et al. |
| 8,042,311 B2 | 10/2011 | Pervan et al. |
| 8,079,196 B2 | 12/2011 | Pervan |
| 8,092,112 B2 | 1/2012 | Borgman et al. |
| 8,206,054 B1 | 6/2012 | Burnett et al. |
| 8,220,217 B2 | 7/2012 | Muehlebach |
| 8,231,301 B1 | 7/2012 | Joyce |
| 8,302,361 B2 | 11/2012 | Braun et al. |
| 8,381,476 B2 | 2/2013 | Hannig |
| 8,387,327 B2 | 3/2013 | Pervan |
| 8,398,905 B2 | 3/2013 | Nilsson |
| 8,511,040 B2 | 8/2013 | Braun et al. |
| 8,621,814 B2 | 1/2014 | Cappelle |
| 8,622,489 B2 | 1/2014 | Crabtree, II |
| 8,641,155 B2 | 2/2014 | Lee |
| 8,707,650 B2 | 4/2014 | Pervan et al. |
| 8,757,917 B2 | 6/2014 | Andersson |
| 8,966,853 B2 | 3/2015 | Hannig |
| 8,991,055 B2 | 3/2015 | Cappelle |
| 2002/0093272 A1 | 7/2002 | Saravis |
| 2003/0066813 A1 | 4/2003 | Taylor |
| 2003/0155847 A1 | 8/2003 | Henkel |
| 2004/0049999 A1 | 3/2004 | Krieger |
| 2004/0090156 A1 | 5/2004 | Kunanantakul |
| 2004/0128934 A1 | 7/2004 | Hecht |
| 2004/0168392 A1 | 9/2004 | Konzelmann et al. |
| 2004/0222722 A1 | 11/2004 | Yang |
| 2004/0253051 A1 | 12/2004 | Napp |
| 2005/0225216 A1 | 10/2005 | Kim |
| 2006/0101769 A1 | 5/2006 | Pervan et al. |
| 2006/0236642 A1 | 10/2006 | Pervan |
| 2006/0260254 A1 | 11/2006 | Pervan |
| 2007/0006543 A1 | 1/2007 | Engstrom |
| 2007/0028547 A1 | 2/2007 | Grafenauer et al. |
| 2007/0134613 A1 | 6/2007 | Kuo et al. |
| 2007/0175143 A1 | 8/2007 | Pervan et al. |
| 2007/0175156 A1 | 8/2007 | Pervan et al. |
| 2007/0193178 A1 | 8/2007 | Groeke et al. |
| 2008/0010937 A1 | 1/2008 | Pervan et al. |
| 2008/0034708 A1 | 2/2008 | Pervan |
| 2008/0053029 A1 | 3/2008 | Ricker |
| 2008/0066415 A1 | 3/2008 | Pervan et al. |
| 2008/0104921 A1 | 5/2008 | Pervan et al. |
| 2008/0110125 A1 | 5/2008 | Pervan |
| 2008/0134614 A1 | 6/2008 | Pervan et al. |
| 2008/0155930 A1 | 7/2008 | Pervan et al. |
| 2008/0236088 A1 | 10/2008 | Hannig |
| 2008/0302051 A1 | 12/2008 | Bearinger et al. |
| 2009/0019806 A1 | 1/2009 | Muehlbach |
| 2009/0042019 A1 | 2/2009 | Nilsson |
| 2009/0100782 A1 | 4/2009 | Groeke et al. |
| 2009/0129859 A1 | 5/2009 | Andersson |
| 2009/0193748 A1 | 8/2009 | Boo et al. |
| 2009/0249723 A1 | 10/2009 | Clark et al. |
| 2010/0009115 A1 | 1/2010 | Ruhdorfer |
| 2010/0021699 A1 | 1/2010 | Engstrom et al. |
| 2010/0043333 A1 | 2/2010 | Hannig |
| 2010/0173122 A1 | 7/2010 | Susnjara |
| 2010/0189492 A1 | 7/2010 | Green |
| 2010/0205888 A1 | 8/2010 | Krige |
| 2010/0290831 A1 | 11/2010 | Burnett et al. |
| 2011/0126487 A1 | 6/2011 | Browning et al. |
| 2011/0206448 A1 | 8/2011 | Clinch et al. |
| 2011/0271632 A1 | 11/2011 | Cappelle et al. |
| 2011/0280655 A1 | 11/2011 | Maertens et al. |
| 2012/0027967 A1 | 2/2012 | Maertens et al. |
| 2012/0036804 A1 | 2/2012 | Pervan |
| 2012/0073235 A1 | 3/2012 | Hannig |
| 2012/0133259 A1 | 5/2012 | Babucke-Runte et al. |
| 2012/0217671 A1 | 8/2012 | Nilsson |
| 2013/0051905 A1 | 2/2013 | Andersson |
| 2013/0071172 A1 | 3/2013 | Maertens et al. |
| 2013/0170904 A1 | 7/2013 | Cappelle et al. |
| 2013/0241103 A1 | 9/2013 | Engstrom |
| 2014/0033630 A1 | 2/2014 | Engstrom |
| 2014/0042115 A1 | 2/2014 | Lee |
| 2014/0130437 A1 | 5/2014 | Cappelle |
| 2014/0190112 A1 | 7/2014 | Pervan et al. |
| 2014/0255092 A1 | 9/2014 | Andersson |

FOREIGN PATENT DOCUMENTS

| | | |
|---|---|---|
| CA | 1 065 944 A1 | 11/1979 |
| CA | 1 240 914 A1 | 8/1988 |
| CA | 1 279 814 C | 2/1991 |
| CA | 1 296 611 C | 3/1992 |
| CA | 1 297 525 C | 3/1992 |
| CH | 83681 A | 1/1920 |
| CH | 616 617 A5 | 4/1980 |
| CN | 2404402 Y | 11/2000 |
| CN | 2492701 Y | 5/2002 |
| CN | 101099618 A | 1/2008 |
| DE | 808 626 C | 7/1951 |
| DE | 1 812 390 U | 6/1960 |
| DE | 1 484 108 A1 | 4/1969 |
| DE | 1 298 440 B | 6/1969 |
| DE | 6909680 U | 9/1969 |
| DE | 6923049 U | 10/1969 |
| DE | 1 935 283 A1 | 1/1971 |
| DE | 1 654 545 A1 | 5/1971 |
| DE | 1 955 922 A1 | 6/1971 |
| DE | 2 008 785 A1 | 9/1971 |
| DE | 2153713 A1 | 5/1973 |
| DE | 2 300 675 A1 | 7/1974 |
| DE | 24 26 722 A1 | 12/1975 |
| DE | 23 30 532 B2 | 9/1978 |
| DE | 30 41 781 A1 | 6/1982 |
| DE | 32 44 398 C2 | 5/1985 |
| DE | 87 08 112 U1 | 9/1987 |
| DE | 42 24 250 A1 | 1/1994 |
| DE | 19 503 948 A1 | 8/1996 |
| DE | 197 06 651 A1 | 8/1998 |
| DE | 198 27 597 A1 | 12/1999 |
| DE | 200 09 333 U1 | 9/2000 |
| DE | 39 37 231 C2 | 1/2001 |
| DE | 20 2004 010 897 U1 | 11/2004 |
| DE | 20 2004 013 651 U1 | 11/2004 |
| DE | 20 2005 005 498 U1 | 6/2005 |
| DE | 10 2004 055 951 A1 | 7/2005 |
| DE | 103 44 161 B4 | 9/2005 |
| DE | 202005010758 U1 | 9/2005 |
| DE | 20 2004 019 882 U1 | 4/2006 |
| DE | 10 2008 005 067 A1 | 7/2009 |
| DE | 20 2008 004 145 U1 | 8/2009 |
| DE | 20 2008 004 148 U1 | 8/2009 |
| DE | 20 2009 008 825 U1 | 10/2009 |
| DE | 202009008825 U1 | 10/2009 |
| DE | 20 2009 010 381 U1 | 11/2009 |
| DE | 20 2009 018 418 U1 | 8/2011 |
| DE | 10 2006 007 522 B4 | 1/2013 |
| EP | 0 077 092 A1 | 4/1983 |
| EP | 0 274 683 A1 | 7/1988 |
| EP | 0 330 748 A2 | 9/1989 |
| EP | 0 479 767 A1 | 4/1992 |
| EP | 0 423 596 B1 | 4/1993 |

(56) References Cited

FOREIGN PATENT DOCUMENTS

| | | |
|---|---|---|
| EP | 0 698 357 A1 | 2/1996 |
| EP | 0 543 589 B1 | 4/1996 |
| EP | 0 871 156 A2 | 10/1998 |
| EP | 1 035 334 A1 | 9/2000 |
| EP | 1 344 950 A1 | 9/2003 |
| EP | 1 374 737 A1 | 1/2004 |
| EP | 1 420 125 A2 | 5/2004 |
| EP | 1 554 951 A1 | 7/2005 |
| EP | 1 574 633 A3 | 10/2005 |
| EP | 0 756 044 B1 | 11/2005 |
| EP | 1671562 A1 | 6/2006 |
| EP | 2 065 526 A2 | 6/2009 |
| EP | 2 105 063 A1 | 9/2009 |
| EP | 2 105 064 A1 | 9/2009 |
| EP | 2 250 926 A2 | 11/2010 |
| EP | 2 348 222 A1 | 7/2011 |
| EP | 1 647 205 B1 | 12/2011 |
| EP | 2 015 652 B1 | 3/2012 |
| EP | 1 855 854 B1 | 4/2012 |
| EP | 2 260 742 B1 | 9/2012 |
| EP | 2378921 B1 | 3/2014 |
| FR | 1 016 352 A | 11/1952 |
| FR | 1 103 169 A | 10/1955 |
| FR | 1318585 A | 2/1963 |
| FR | 1 345 888 A | 12/1963 |
| FR | 1 557 100 A | 2/1969 |
| FR | 2 143 136 B1 | 7/1973 |
| FR | 2 186 076 A5 | 1/1974 |
| FR | 2 313 629 B1 | 9/1978 |
| FR | 2 597 173 B1 | 10/1988 |
| FR | 2826391 A1 | 12/2002 |
| FR | 2 949 046 A1 | 2/2011 |
| GB | 598 687 A | 2/1948 |
| GB | 794 401 A | 5/1958 |
| GB | 1 004 008 A | 9/1965 |
| GB | 1 046 810 A | 10/1966 |
| GB | 2041146 A | 9/1980 |
| GB | 2 051 916 A | 1/1981 |
| GB | 2256023 A | 11/1992 |
| GB | 2 281 950 A | 3/1995 |
| GB | 2 408 554 A | 6/2005 |
| GB | 2 428 078 B | 8/2008 |
| GB | 2 460 856 A | 12/2009 |
| JP | S58-41251 U | 3/1983 |
| JP | S58-149709 A | 9/1983 |
| JP | H04-50633 U | 4/1992 |
| JP | 2006-020979 A | 1/2006 |
| JP | 4854248 B2 | 1/2012 |
| JP | 3176020 U | 6/2012 |
| JP | 5574316 B2 | 8/2014 |
| NL | 6912630 A | 2/1971 |
| NL | 8502524 A | 4/1987 |
| NL | 1034336 C2 | 3/2009 |
| RU | 2 063 158 C1 | 7/1996 |
| WO | 87/00406 A1 | 1/1987 |
| WO | 94/10462 A1 | 5/1994 |
| WO | 9747834 A1 | 12/1997 |
| WO | 99/22150 A1 | 5/1999 |
| WO | 02/33271 A1 | 4/2002 |
| WO | 03/016654 A1 | 2/2003 |
| WO | 2004/052150 A1 | 6/2004 |
| WO | 2004085765 A1 | 10/2004 |
| WO | 2005/020754 A1 | 3/2005 |
| WO | 2005046950 A1 | 5/2005 |
| WO | 2006/008393 A1 | 1/2006 |
| WO | 2007/079845 A1 | 7/2007 |
| WO | 2007/131903 A2 | 11/2007 |
| WO | 2007145572 A1 | 12/2007 |
| WO | 2008021044 A2 | 2/2008 |
| WO | 2008/068245 A1 | 6/2008 |
| WO | 2008/083662 A1 | 7/2008 |
| WO | 2008098783 A1 | 8/2008 |
| WO | 2008/150234 A1 | 12/2008 |
| WO | 2009/044235 A8 | 4/2009 |
| WO | 2009/066153 A2 | 5/2009 |
| WO | 2010070605 A2 | 6/2010 |
| WO | 2010/078509 A1 | 7/2010 |
| WO | 2011/000751 A1 | 1/2011 |
| WO | 2011/070307 A1 | 6/2011 |

OTHER PUBLICATIONS

International Search Report and Written Opinion issued in PCT/IB2011/051276, dated Nov. 21, 2011.
Belgian Search Report and Written Opinion issued in BE 201000341, Mar. 8, 2011.
Belgian Search Report and Written Opinion issued in BE 201100106, Jan. 13, 2012.
EP opposition case against European Patent No. 2 378 921 B1, Dec. 19, 2014.
International Search Report and Written Opinion from International Application No. PCT/IB2009/055816, Dec. 2, 2010.
International Search Report and Written Opinion of Application No. PCT/IB2009/054812, Dec. 2, 2010.
Search Report and Written Opinion of EPO regarding Belgium Patent Application 2008/0677, Oct. 28, 2009.
Binsch et al., "Specialist for Carpentry", Europe Directory, Wood Technology, 14th Edition, Publishing Europe Training, Nourney, Vollmer GmbH & Co, 1990, 7 Pages.
Further Submission of Opponent in European Patent No. EP 2378921, Jan. 25, 2017, 3 Pages.
Opposition to European Patent No. EP 2378921, Dec. 19, 2014, 39 Pages.
Response to the Preliminary Opinion of the Opposition Division, EP Patent 2378921, Dec. 22, 2016.
Response to Opposition against EP Patent No. 2378921, Jun. 3, 2015, 9 Pages.
Result of Oral Proceedings regarding Opposition against Application No. 09807461.0, Feb. 7, 2017, 1 Page.
Submission of Opponent against EP Patent No. 2378921 Sep. 7, 2015, 7 Pages.
Summons to Attend Oral Proceedings for EP Application No. 09807461.0, Jun. 2, 2016, 10 Pages.
International Search Report and Written Opinion from PCT Application No. PCT/IB2011/052240, Apr. 10, 2014.
International Search Report and Written Opinion from PCT Application No. PCT/IB2011/051276, Nov. 21, 2011.
Belgian Search Report and Written Opinion from BE 201000341, Mar. 8, 2011.
Belgian Search Report and Written Opinion from BE 201100106, Jan. 13, 2012.
Submission of Opponent against EP Patent No. 2378921 Jul. 17, 2015, 16 Pages.

\* cited by examiner

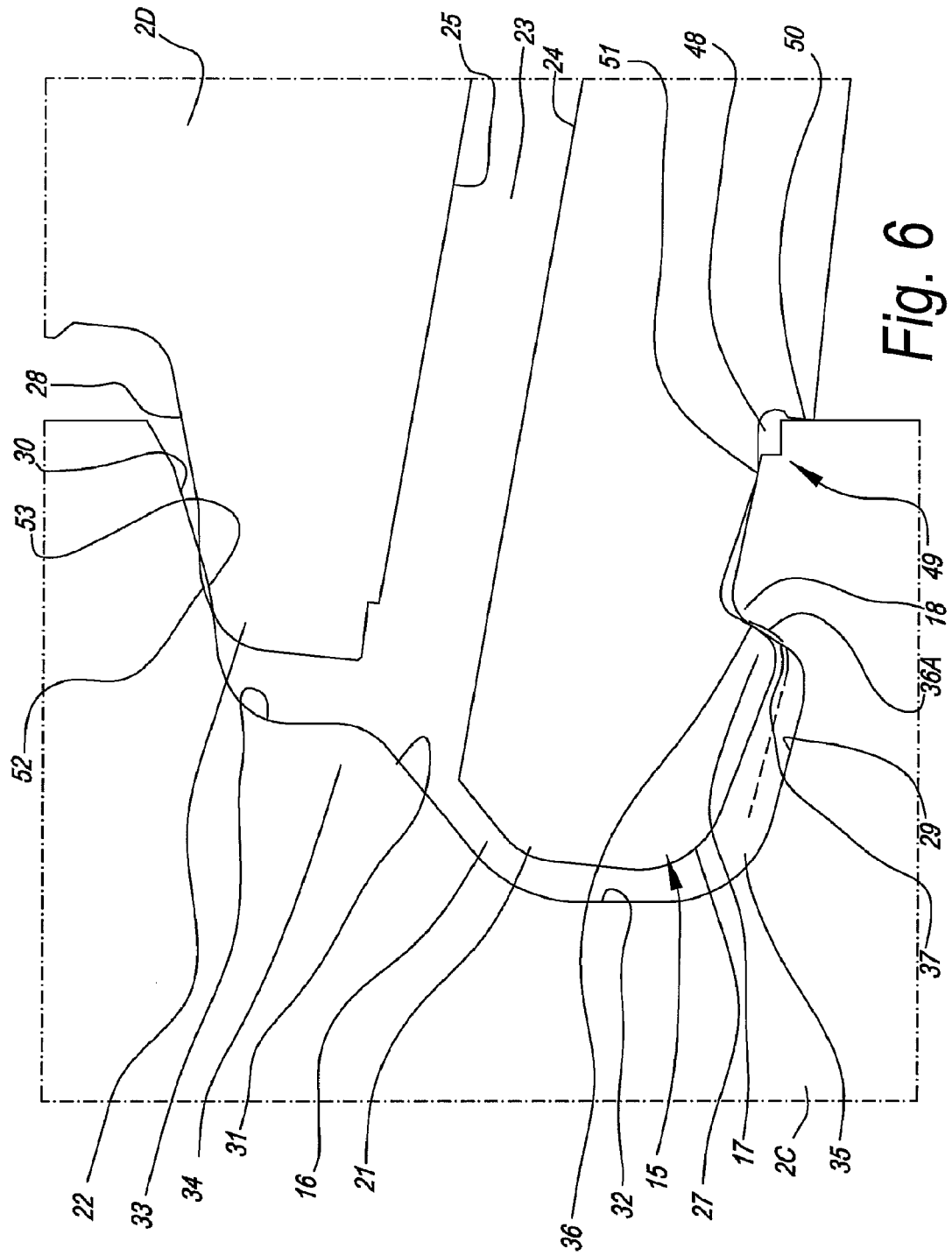

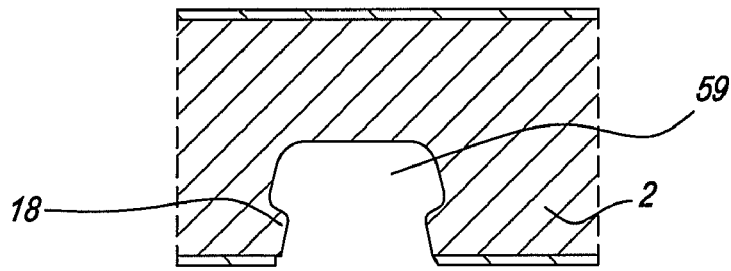
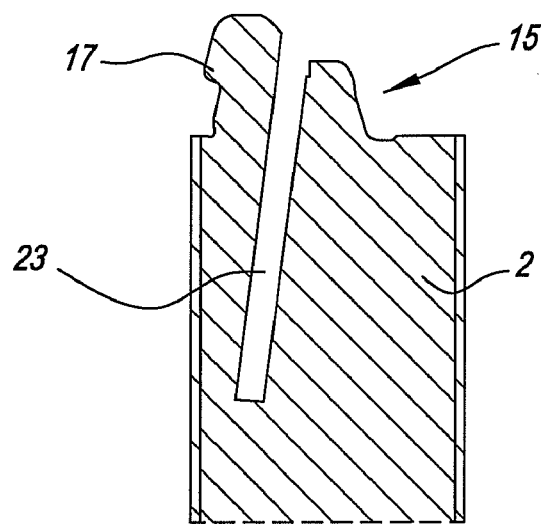
Fig. 11
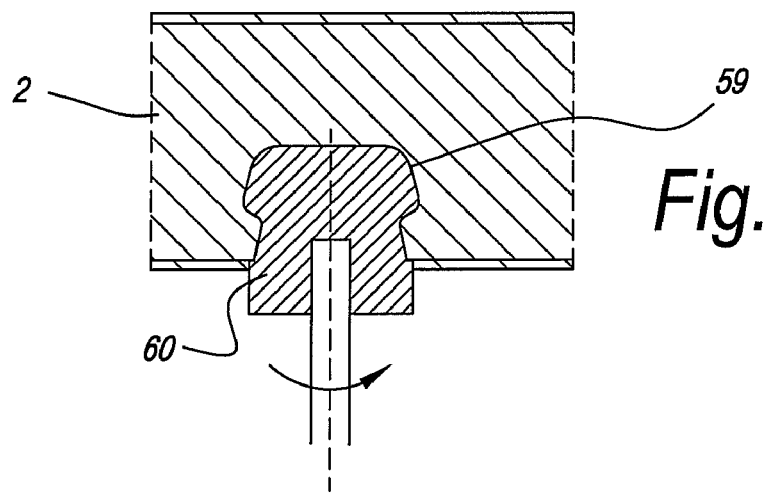
Fig. 12

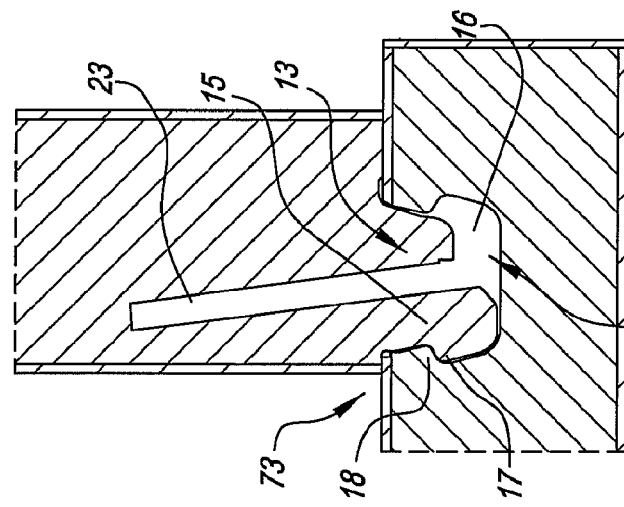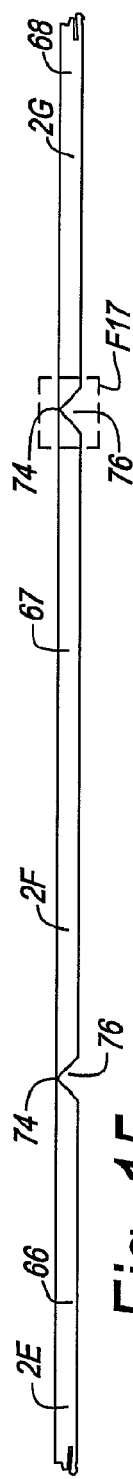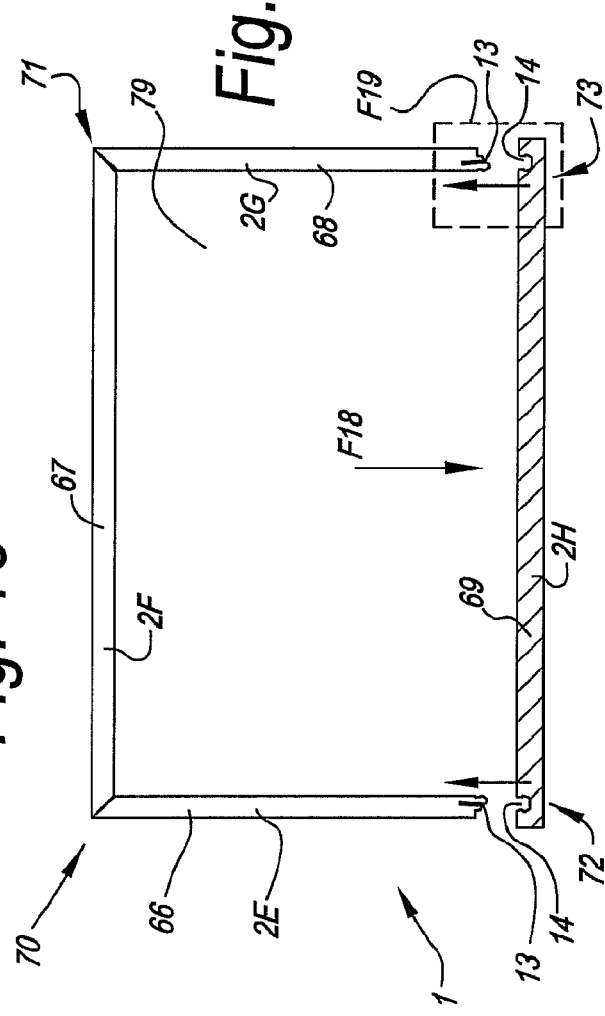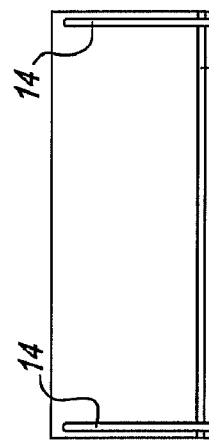

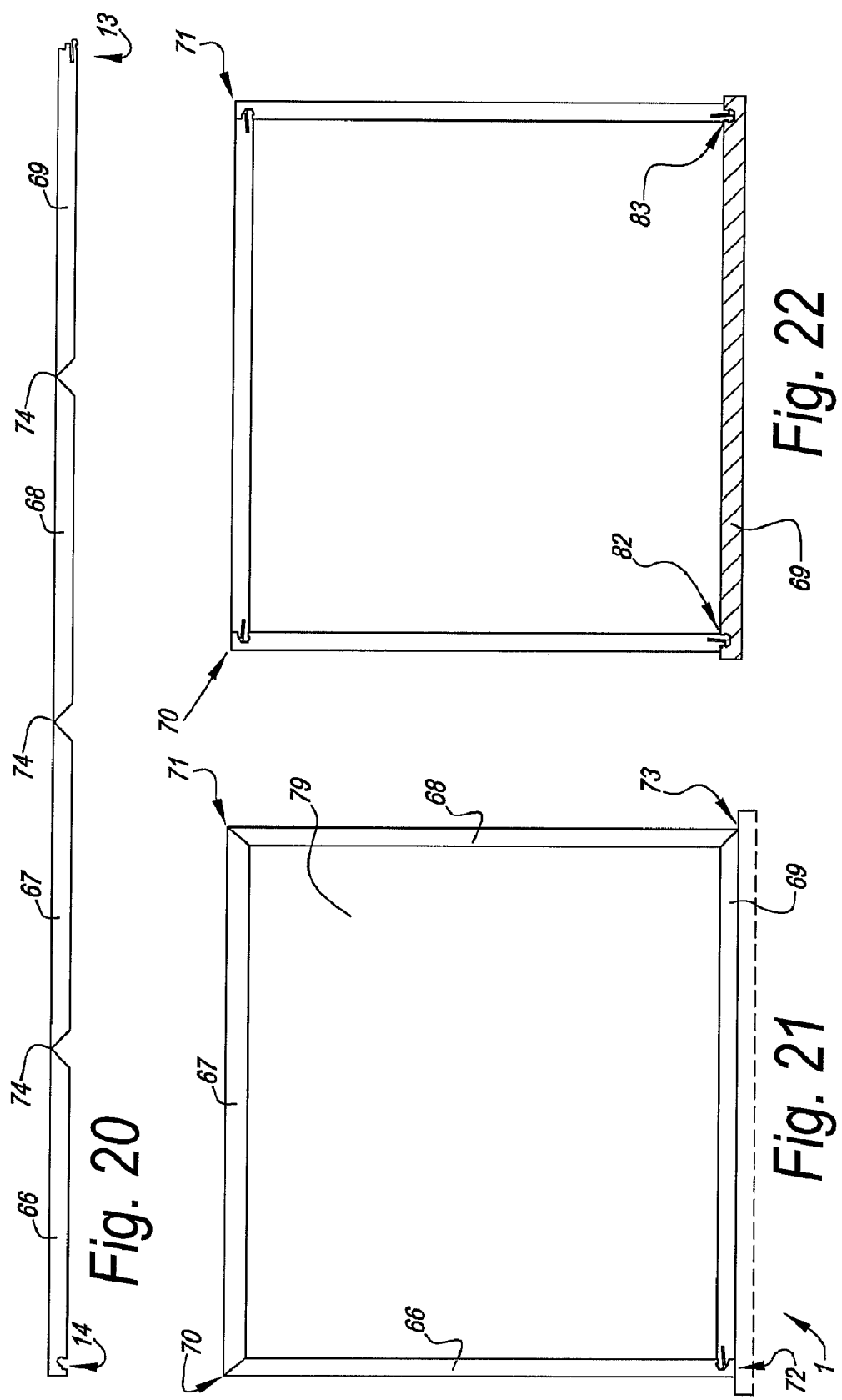

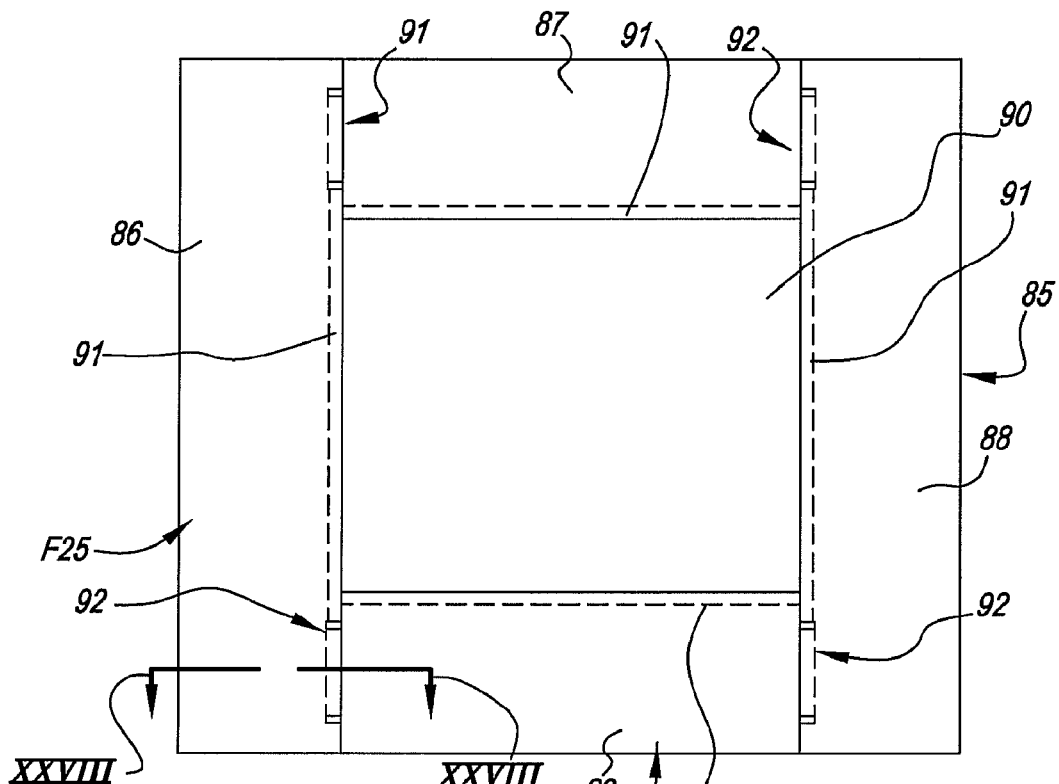
Fig. 24
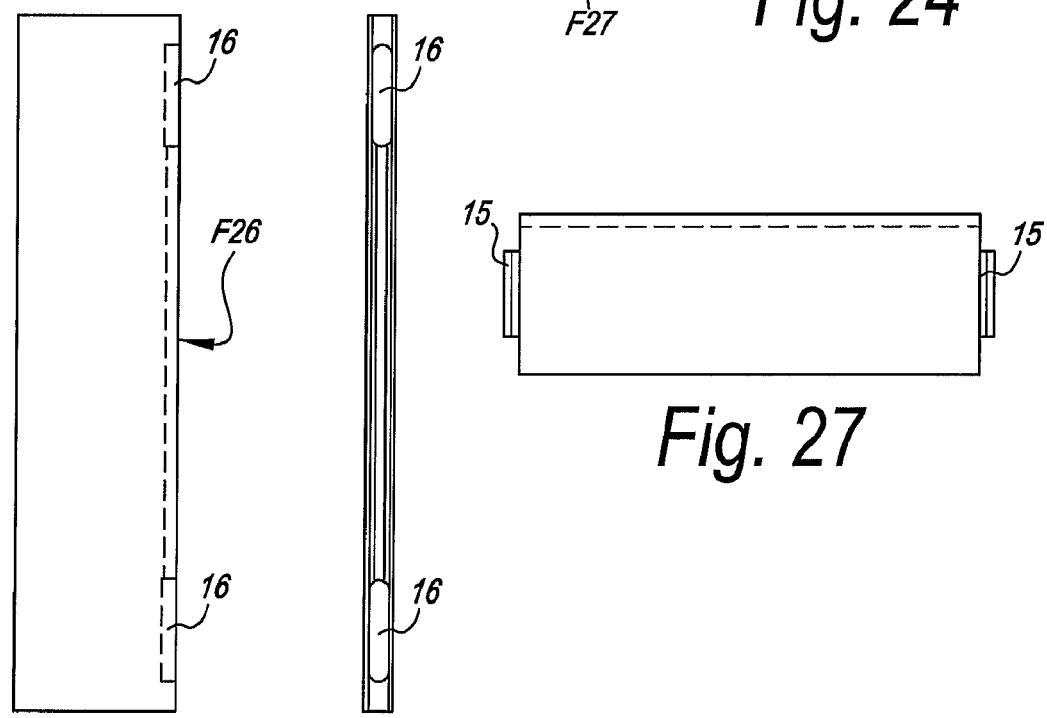
Fig. 25  Fig. 26
Fig. 27

COMPOSED ELEMENT AND CORNER CONNECTION APPLIED HEREWITH

BACKGROUND

1. Field of the Disclosure

This invention relates to a composed element, as well as to a corner connection which is applied herewith.

More particularly, the invention relates to a composed element which comprises at least two panel-shaped elements, which are coupled to each other, can be coupled to each other, respectively, at an angle, whether or not by means of an intermediate piece. Herein, the invention relates to any form of composed element which comprises at least two or more panel-shaped elements, irrespective of the field of application, and irrespective of the fact whether the composed element substantially consists exclusively of the panel-shaped elements or whether these panel-shaped elements only form a part thereof.

Although the invention can be used in any application, it is intended in the first place for being applied in the furniture sector, with individual pieces of furniture as well as with built-in furniture, such as dressing furniture, room dividers and the like.

More particularly, the invention aims at connections between panel-shaped elements, which can be realized in a smooth manner and are suitable for being employed with furniture which is sold in dismantled condition and must be assembled by the buyer himself. Herein, this relates in the first place to so-called flat-pack furniture.

2. Related Art

Still more particularly, the invention relates to a composed element which comprises two or more panel-shaped elements, which each comprise a coupling zone in which coupling parts are present in the form of a profile respectively extending in the longitudinal direction of the respective coupling zone, preferably in the form of a tongue and a groove, respectively, wherein these profiles allow that the panel-shaped elements can be coupled to each other in a locking manner and at an angle. Such composed element is known, amongst others, from document DE 20 2009 008 825 U1. The use of such profiles, which are provided in the panel-shaped elements themselves and are made entirely or for the major part in one piece therewith, offers the advantage that no separate elements are necessary for connecting the panel-shaped elements at an angle, such as, for example, metal connection elements, or at least the use of such separate elements can be limited to a minimum. Another advantage thereof consists in that such profiles can be milled in a simple manner into the panel-shaped elements and that a continuous locking coupling can be realized along the entire corner connection.

It is clear that such coupling, during coupling as well as there after, is subjected to forces. Considering that the profiles in fact mostly have to be realized in relatively thin panels and more over also often have to be suited for being realized in particle board, which, as known, is brittle, the known profiles offer only a limited number of possibilities for optimization.

Thus, the present invention aims at improving such composed element, in particular of the type as described in DE 20 2009 008 825 U1.

SUMMARY

To this aim, the invention, according to a first aspect, relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece; wherein the tongue consists of a split tongue, with, thus, at least a first part and a second part, as well as a slit located there between; and wherein at the outer side of at least said first part, a locking part is present, with the characteristic that the slit, seen in cross-section of the tongue, comprises at least one side, the course of which, seen in cross-section, deviates from the main direction belonging to the tongue. By making use of a slit, of which at least one side has a deviating course, the advantage is obtained that a new parameter is created, which offers new possibilities for optimizing such coupling.

In the most preferred embodiment, the second part of the tongue is free from locking parts. This allows that the tongue, at the second part, always fits smoothly into the groove and the optimization of the engagement and locking can be realized practically exclusively via the second part. According to a variant, the second part of the tongue in fact shall comprise a locking part, which, however, then is less pronounced than the locking part present on the first part of the tongue.

According to still another preferred characteristic, the tongue and groove can be turned into each other, wherein the corner, from which they can be turned into each other, forms an inner corner, and of both said parts of the tongue, the first part is situated closest to the inner corner. This allows a smooth engagement by means of a turning movement.

More particularly, it is preferred that the tongue is situated eccentrically in respect to the panel-shaped element on which it is provided, or in respect to the panel-shaped element in which it engages, such preferably in the direction of the herein aforementioned inner corner. Due to the eccentric arrangement, the tongue can be kept farther away from the outer corner, by which more material remains available at the outer corner and consequently a more solid construction is maintained there, by which the risk of breaking off of material parts is reduced. The eccentric arrangement towards the inner corner also allows to turn the tongue more smoothly into the groove.

According to another preferred characteristic, the tongue is composed such that the first part of the tongue protrudes farther than the second part of the tongue. The advantage is that the first part then offers sufficient room for the locking part, whereas the second part is kept smaller in order to allow for a smooth turning movement and/or to be able to leave more material at the location of the groove.

According to the invention, it is preferred that at least the side of the slit which is situated on the first part has a course which deviates from the aforementioned main direction. By this, it is obtained that the features of the first part of the tongue, in respect to strength as well as to elasticity, can be influenced and that in this manner, the advantage is obtained that new parameters are created for the design engineer for realizing a coupling in function of the intended result. This is of great importance with the first part of the tongue, as it comprises the most important locking part, and as the elastic movability thereof, as well as the stability thereof, are determining for the good function and the strength of the coupling. More specifically, it is preferred that the aforementioned side towards inside in the slit substantially approaches the plane determined by the surface of the panel-shaped element which is situated on the same side as the first part of the tongue. Hereby, it is obtained that the end of the first part remains relatively solid and strong, which is beneficial for the strength of the locking part provided thereon, whereas towards inside more elasticity is created, which is of importance for creating a suitable elasticity by which the first part of the tongue and the pertaining locking part can be displaced. In that both features in this manner are determined on two different locations by the technical shape prevailing there, also the advantage is obtained that the design engineer can influence these features independently.

It is clear that according to the invention, whether or not in combination with the preceding secondary characteristics, also at the side of the slit which is situated on the second part can be given a course which deviates from the aforementioned main direction. As such, this also offers the advantage that a new parameter is created which can be employed by a design engineer for optimizing the technical characteristics of the tongue and groove coupling in function of the desired effect. In this case, too, it is preferred that the respective side towards inside in the slit substantially approaches the plane determined by the surface of the panel-shaped element which is situated on the same side as the first part of the tongue. By such course, it becomes possible, amongst others, to realize the base of the second part relatively solid and thus also stable, however, keeping the tip thereof slim, such that more room is made at the height of this tip, by which this room then again can be used for making the tip of the first part more stable.

The sides which, as aforementioned, show a course deviating from the main direction, preferably extend substantially globally inclined, and more particularly straight-lined over the major part of their length. More particularly, it is preferred that the slit, globally seen, extends at an angle, preferably with parallel sides, more particularly made by an incision. This allows realizing such side, and even the entire slit, in a simple manner by a saw cutter. Such inclined slit having an even width over its length thus can combine at least three advantages, namely, the easy realization thereof; the optimization of the first part and the optimization of the second part.

Preferably, the slit extends deeper than the base of the tongue, and the side, sides, respectively, which deviate from the main direction, will show such deviating course at least for the part of the slit reaching deeper than said base. In this manner, not only the protruding parts of the tongue are responsible for the behavior of the tongue during joining, but also the more inwardly located edge portion of the panel-shaped element now obtains an influence thereon, with the advantage that further freedom is available for the design engineer. Further, herein it is preferred that the side, sides, respectively, which deviate from the main direction, will show such deviating course at least for the part of the slit reaching deeper than said base. In combination therewith, it is also preferred that the distance with which the slit extends from said base, said closing plane, respectively, inwardly in the panel-shaped element or auxiliary piece, is larger than the largest distance with which the tongue reaches up to outward of the closing plane and/or outward of its base.

It is noted that the tongue preferably is situated on the end wall edge of a panel-shaped element and that by a plane pertaining to the tongue, a plane has to be understood in which the panel-shaped element is located.

According to preferred embodiments, the composed element can also show one or more of the following characteristics:
the tongue and groove have such a configuration that they can be put in each other by means of a snap movement;
the tongue and the groove have such a profile that they can be brought into a mutually coupled condition by means of a turning movement as well as by means of a displacement towards each other, which displacement is combined with a snap action;
the tongue is made in one piece with a panel-shaped element, and preferably formed in the material itself, from a basic board with which the panel-shaped element is formed;
the groove is situated in the lateral face of a panel-shaped element;
the groove is made in one piece in a panel-shaped element, and preferably formed in the material itself, from a basic board with which the panel-shaped element is formed;

Further, the composed element, in respect to the material thereof, preferably shows one or more of the following characteristics:
the panel-shaped elements substantially consist of a basic board which is a wood-based pressed board;
the panel-shaped elements substantially consist of a basic board formed of MDF or HDF;
the panel-shaped elements substantially consist of a basic board formed of particle board;
the panel-shaped elements are formed of melaminated board;
the panel-shaped elements comprise a light-weight board, possibly with borders of another material;
the panel-shaped elements are designed as a hollow board, or as a board provided with hollow spaces, for example, with a honeycomb core, possibly with borders of another material.

The above-mentioned materials offer the advantage that they are relatively inexpensive. The use of borders is useful when the board itself does not allow forming profiles therein, such as, for example, with honeycomb panels. The borders then may consist, for example, of laths, in which the desired profiles can be provided indeed.

According to a second independent aspect, the invention relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece, and wherein the tongue consists of a split tongue, with, thus, at least a first part and a second part and a slit located there between; and wherein at the outer side of exclusively the first part, a locking part is present and wherein the tongue fits into the groove by means of a turning movement, with the characteristic that the tongue and the groove define a closing plane and the slit extends deeper than this closing plane; that the aforementioned two parts of the tongue define at least two contact points where the tongue and groove, in mounted condition, are in contact with each other, a first contact point formed by the contact, situated closest to the closing plane, between the first part of the tongue and the groove, and a second contact point formed by the contact, situated farthest from the closing plane, between the second part of the tongue and the groove; and that the first contact point is situated closer to the closing plane than the second contact point. The advantage of this second aspect will become clear from the further description.

It is noted that the closing plane preferably is defined as the side of the panel-shaped element or the intermediate piece in which the groove is provided.

According to a third independent aspect, the invention relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece; wherein the tongue consists of a split tongue, with, thus, at least a first part and a second part and a slit located there between; and wherein at the outer side of the first part, a locking part is present, whereas at the outer side of the second part, a less pronounced and preferably even no locking part is present; with the characteristic that the tongue and the groove define a closing plane and that the second part of the tongue protrudes out of the closing plane with a length which is smaller than 0.75 times the length with which the first part of the tongue protrudes out of the closing plane. The advantages hereof will also become clear from the further description.

According to a fourth independent aspect, the invention relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece; wherein the tongue consists of a split tongue, with, thus, at least a first part and a second part and a slit located there between; and wherein at the outer side of the first part, a locking part is present, whereas at the outer side of the second part, a less pronounced and preferably even no locking part is present; wherein the locking part, at the first part of the tongue, comprises a locking surface which cooperates with a locking surface on the groove; and wherein the tongue and the groove define a closing plane and said slit reaches so deep that it extends to beyond the closing plane; with the characteristic that the second part of the tongue protrudes out of the closing plane with a length which is smaller than 1.5 times the average distance with which the locking surfaces are located from the closing plane, and still better smaller than 1.4 times this distance. The advantages hereof will also become clear from the further detailed description.

According to a fifth independent aspect, the invention relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece; wherein the tongue consists of a split tongue, with, thus, at least a first part and a second part and a slit located there between; and wherein at the outer side of the first part, a locking part is present, whereas at the outer side of the second part, a less pronounced and preferably even no locking part is present; wherein the locking part, at the first part of the tongue, comprises a locking surface which cooperates with a locking surface on the groove; and wherein the tongue and the groove define a closing plane; with the characteristic that the part of the first part of the tongue which extends between the closing plane and the locking surfaces has an average thickness which is larger than the average thickness of the second part of the tongue. Advantages thereof will also become clear from the further description.

According to a sixth independent aspect, the invention relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece; wherein the tongue consists of a split tongue, with, thus, at least a first part and a second part and a slit located there between; where the slit remains free in the coupled condition; wherein at the outer side of at least one of the aforementioned parts, a locking part is present; and wherein the tongue and the groove define a closing plane and said slit reaches so deep that it extends to beyond the closing plane; with the characteristic that the slit, in the coupled condition, reaches from the closing plane inwards over a distance which is larger than the largest distance with which the tongue reaches out of the closing plane. Such embodiment offers the advantage that a relatively large elasticity can be imparted to one or both parts of the tongue, without the protruding parts of the tongue having to protrude far out of the closing plane.

According to a seventh independent aspect, the invention relates to a composed element which comprises at least two panel-shaped elements, which, by means of a locking tongue and groove connection, can be coupled to each other at an angle, whether directly or indirectly by means of an intermediate piece, wherein said connection comprises, at least at one of the panel-shaped elements, a tongue or groove, which can cooperate with a groove or tongue provided on the other panel-shaped element or on the intermediate piece; wherein the tongue and the groove can be coupled to each other into a mutually locked condition by means of a turning movement; wherein the tongue on only one side comprises a locking part, such on the side from where the tongue can be turned into the groove; and wherein the locking part comprises a locking surface cooperating with a locking surface on the groove; with the characteristic that the tongue and the groove have such a configuration that during turning into each other, towards the end of the turning movement, a force peak has to be overcome, such that also when again turning out of each other, a force has to be overcome. The benefit thereof will become clear from the further description.

According to a preferred embodiment of the seventh aspect, the tongue, at the side where no locking part is present, comprises a part which, during the turning into or out of each other, theoretically overlaps with a part on the groove, such that a deformation force at a dead point has to be overcome.

According to another preferred embodiment of the seventh aspect, the tongue and groove, at the height of the locking parts, comprise parts which, by a theoretical overlap, during turning provide for that a deformation force has to be overcome at a dead point.

It is clear that the invention also relates to elements which are intended for forming, together with one or more other elements, a composed element according to any of the preceding aspects, wherein it is provided at least with a tongue or a groove as described herein above. The invention also relates to corner connections as such, which are realized as described herein above.

It is noted that all aforementioned, as well as herein below also mentioned aspects can be combined at choice, inasmuch as they do not show any contradictory characteristics; such according to all combinations possible between such aspects. Also, all secondary characteristics, which are described by means of the first aspect, can be applied at choice in combination with the second, third, fourth, fifth, sixth and seventh aspect, this also inasmuch such combinations do not result in contradictory characteristics.

It is noted that in the aforementioned slit, an elastic element or filler can be present, for example, for supporting the elasticity of the movable first part.

According to an eighth aspect, the invention relates to a composed element which comprises at least three panel-shaped elements, which can be coupled to each other by means of corner connections, characterized in that this composed elements comprises at least two corner connections with coupling parts providing for locking tongue and groove connections, wherein these corner connections differ from each other at least in that a first corner connection comprises coupling parts which can be joined together at least by means of a snap-insert-movement, whereas another, second corner connection comprises coupling parts which either can be joined together exclusively by a turning movement, or can be joined together by means of a snap-insert-movement, wherein the snap effect of the second corner connection is stiffer than with the first corner connection. By making use of such different "first" and "second" corner connections, amongst others, the possibility is obtained of applying, on locations where panel-shaped elements can be turned into each other, the "second" corner connections, such that sturdy connections are realized, whereas on locations where it is not possible other than using a snap connection, then the "first" corner connections can be applied, such that a smooth assembly by a snap movement is possible there.

Preferably, the first corner connection as well as the second corner connection allow that the respective tongue and groove can be joined together by means of a turning movement.

According to a first possibility, the aforementioned difference is realized at least by applying a split tongue at the first corner connection and applying a full tongue at the second corner connection. The split tongue then is more elastic and allows a smooth snap action.

According to a second possibility, both corner connections have a split tongue and the aforementioned difference is realized at least, and preferably substantially, by performing these split tongues different from each other.

More particularly, the difference in stiffness in the snap effect is realized at least and preferably substantially by a difference in the configuration of the slits of the split tongues. These slits, by adapting the shape thereof, allow choosing said stiffness in a smooth manner.

Preferably, the difference is realized by applying any of the following possibilities or any combination thereof:
  the slits of the two corner connections are performed such that the thinnest material parts between the respective slit and the closest side wall, respectively, show a different thickness;
  the slits of the two corner connections are performed such that the one slit extends deeper than the other slit, in other words, they show different depths;
  the slits of the two corner connections are performed such that the slits extend at different angles in respect to the panel-shaped elements.

The eighth aspect is in particular advantageous with corner connections of the type wherein the tongue has a locking part on one side only, more particularly on the part of the tongue which is most movable.

According to the ninth aspect, the invention relates to a composed element which comprises at least two panel-shaped elements, which can be coupled to each other by means of a corner connection, by means of coupling parts providing for a locking tongue and groove connection, wherein the tongue on one side comprises a locking part and on the other side is free from a locking part or comprises a less pronounced locking part and thus is asymmetrical, and wherein the tongue and groove connection is of the type allowing that the tongue fits into the groove by means of a turning movement; with the characteristic that the groove, seen in cross-section, is substantially and preferably entirely symmetrical. Herein, the advantage is obtained that such groove can be formed easily by a finger milling cutter and that such groove can be realized as a dead-end groove, which is not possible when a groove is realized by means of classical large milling tools. By making use of the symmetrical groove, new application possibilities are generated. Moreover, herein the same tongues can be applied as with the non-symmetrical grooves, such that for the tongues, the same set of milling tools or the like can be applied, irrespectively whether these are intended for cooperating with a symmetrical or an asymmetrical groove.

According to a tenth aspect, the invention relates to a composed element in the form of a piece of furniture or a furniture component, with the characteristic that it comprises a number of panel-shaped elements functioning as walls, which, in the composed form of the element, form at least two corners, characterized in that at the location of at least one of the corners, use is made of a corner connection between the adjacent walls, which comprises a film hinge, whereas at the location of at least one of the other corners, use is made of a corner connection with mechanically locking coupling parts, more particularly a locking tongue and groove connection. The combination of these two types of corner connection in a composed element allows designing the whole in a constructively simple manner, but at the same time can be assembled in an efficient and smooth manner. This tenth aspect is in particular advantageous in embodiments in which said four walls, in the composed condition, extend perpendicularly to the same plane, such as the side walls of a drawer, which all stand perpendicularly on the plane of the bottom.

Composed elements, which can be realized in a particularly smooth manner and which also can be assembled in a smooth manner, are obtained when said walls adjoin each other all around and when the walls are composed according to any of the following possibilities:
  as a set of three walls which are linked together at least by means of film hinges, and a fourth wall which, next to its ends, can be connected by means of mechanically locking coupling parts to the ends of the set of three walls;
  as a set of four walls which are linked together at least by means of film hinges, which then form three corner connections, and wherein on the ends of this set mechanically locking coupling parts are present, with which a fourth corner connection can be effected;
  as two sets of two walls, wherein the walls of each set mutually are attached to each other by means of a film hinge, whereas next to the free ends of each set, coupling parts are present allowing to realize locking corner connections between the walls of the two sets.

It is clear that the tenth aspect is intended in particular for being applied when manufacturing drawers, wherein said four walls form the upright standing walls of the drawer.

According to the eleventh aspect, the invention relates to a composed element, wherein this composed element is a drawer, wherein this drawer comprises at least two side walls and a front panel, which is intended to form the visible front side of the drawer, with the characteristic that the front panel is attached directly to the side walls, wherein at least the connection with one side wall, and preferably with both respectively is performed by means of a mechanical locking coupling and wherein the front panel forms the sole upright wall which connects the side walls to each other at their forward-directed ends. Due to this design, a constructively simple composition of a drawer is obtained.

According to a preferred embodiment of the eleventh aspect, such composed element further is characterized in that the mechanically locking coupling is formed from profiles in the form of a tongue and a groove, which comprise locking parts which counteract, more particularly prevent, the moving apart of the tongue and groove, wherein the grooves are situated in the rear side of the front panel, whereas the tongues are situated distally on the forward-directed ends of the side walls. Thereby, the front sides then can be simply pressed down on the side walls. Also, the front sides then only have to be provided with relatively simple groove profiles. This latter is useful when a furniture maker acquires all components of the drawer, with the exception of the front panel, from another manufacturer. The furniture maker then will not have to realize the complicated tongue profiles and only has to provide the groove profiles on the front panels, which possibly can be performed with an inexpensive finger milling cutter.

In the case of drawers, it is noted that it is not excluded that a wall locally has a not straight-lined course, for example, a back wall which locally is recessed in a U-shape, for example, for forming an open passage for cables. Also, in certain applications it may occur that the intended corner connections are not situated on the corner of the drawer, for example, when the side walls reach with their rearward-directed ends to beyond the back wall. Partitions in the drawers are possible as well.

According to a twelfth aspect, the invention relates to a composed element which comprises two or more panel-shaped elements, wherein at least two of these panels each comprise a coupling zone, in which coupling parts are present in the form of a profile respectively extending in the longitudinal direction of the respective coupling zone; wherein these profiles allow that the panel-shaped elements can be coupled to each other in a mechanically locking manner and with their planes at an angle in order to form a corner connection; wherein the profiles comprise a tongue and a groove, as well as locking parts; with the characteristic that in the assembled condition also an adhesive connection, more particularly glue connection, is provided at the location of the corner connection, more particularly at the location of said profiles. By the combination of a locking coupling with a glue connection, the advantage is created that initially a smooth and correct assembly is possible, whereas after hardening of the glue a particularly strong composed element is effected.

It is noted that such extra glue connection or an adherence by means of an adhesive can also be applied in all other aspects of the invention.

According to a thirteenth aspect, the invention relates to a composed element, wherein this composed element is a piece of furniture which makes use of a frame formed by frame panels which are situated in the same plane, with the characteristic that on one or more and preferably all corners of the frame a corner connection is formed in the form of a locking coupling, with coupling parts allowing that the frame panels can be joined together by means of a snap movement. In this manner, a frame can be composed in a simple manner, for example, the frame of a cabinet door.

Finally, the invention, according to a fourteenth aspect, relates to a composed element which comprises two or more panel-shaped elements, wherein at least two of these panel-shaped elements each comprise a coupling zone, in which coupling parts are present in the form of a profile respectively extending in the longitudinal direction of the respective coupling zone; wherein these profiles allow that the panel-shaped elements can be coupled to each other in a mechanically locking manner and at an angle; wherein the profiles comprise a tongue and a groove; wherein the composed element comprises auxiliary means assisting in a correct mutual assembly of the panel-shaped elements, which are formed by a three-dimensional form element in the form of a protrusion which can cooperate with a corresponding recess; with the characteristic that the protrusion, seen in the direction of a cross-section on the respective profile, extends entirely or for the major part through the profile of the tongue, preferably in the form of a protruding plug, whereas the recess is situated at the panel-shaped element comprising the groove, and preferably is realized in the form of a bore. The specific positioning of the protrusion in respect to the tongue, seen in cross-section, offers various advantages, as will become clear from the detailed description.

The auxiliary means are designed such that they prevent that the panel-shaped elements are coupled to each other in a mutually shifted position and/or that they prevent that one tries to couple the wrong panels together.

Further characteristics of the invention will become clear from the description following below and the appended claims.

With the intention of better showing the characteristics of the invention, hereafter, as an example without any limitative character, some preferred embodiments are described, with reference to the accompanying drawings, wherein:

BRIEF DESCRIPTION OF THE DRAWINGS

FIG. 6, at a larger scale, represents the part indicated by F6 in FIG. 5;

FIG. 11 represents a particular embodiment of a coupling, with the parts to be coupled in taken apart condition;

FIG. 12 represents a particular technique for realizing the groove represented in FIG. 11;

FIGS. 15 to 19 relate to a composed element according to the invention, which is realized in the form of a drawer, wherein FIG. 17, at a larger scale, represents the part indicated by F17 in FIG. 15, FIG. 18, at a smaller scale, is a view according to arrow F18, and FIG. 19, at a larger scale and in assembled condition, represents the part indicated by F19;

FIG. 20, in top plan view, represents a set of four upright walls which are connected to each other by means of film hinges;

FIG. 21 represents the set of walls from FIG. 20 in assembled condition in order to form a drawer;

FIG. 22 represents a variant of a drawer according to the invention, in a view similar to that of FIG. 22;

FIG. 24 represents a furniture panel with a frame which is realized in accordance with the invention;

FIG. 25 as such represents the component indicated by F25 in FIG. 24;

FIG. 26 represents a view according to arrow F26 in FIG. 25;

FIG. 27 represents the part illustrated by F27 in FIG. 24;

DETAILED DESCRIPTION OF VARIOUS EMBODIMENTS

Figure 1:
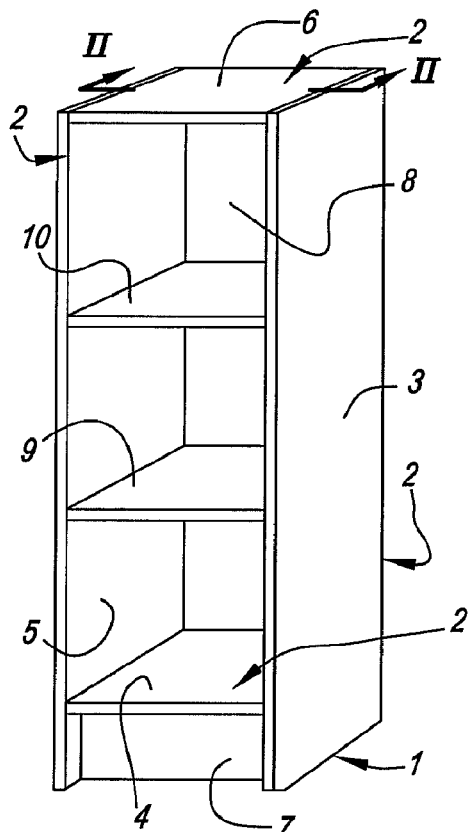
FIG. 1 schematically represents a composed element according to the invention.
Figure 2:
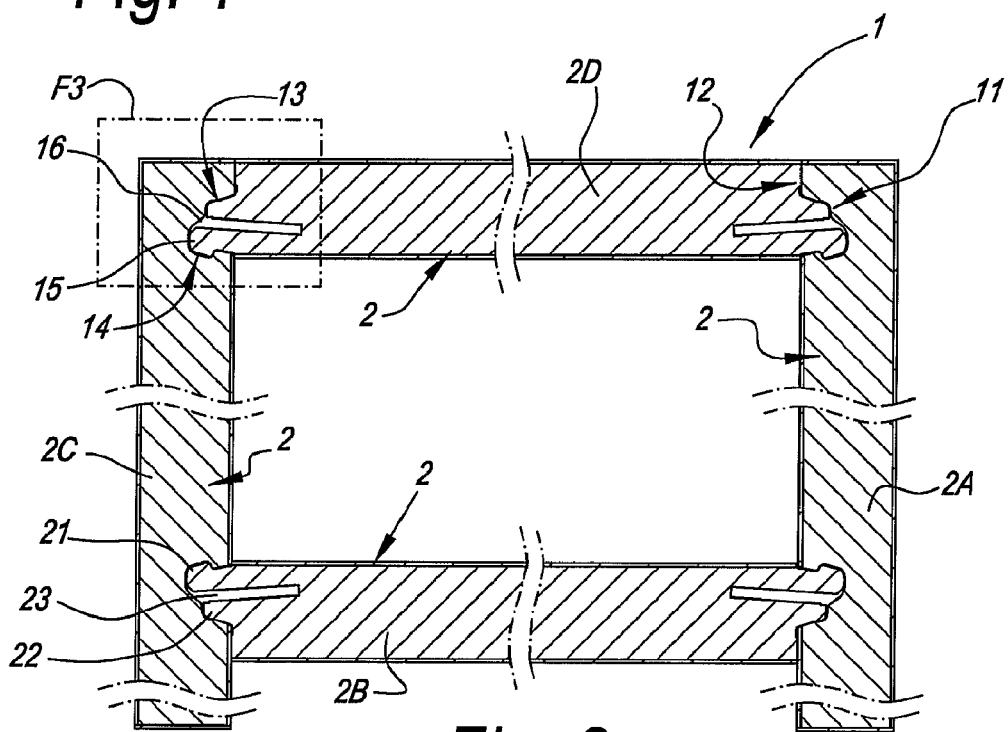
FIG. 2, at a larger scale, represents a cross-section according to line II-II in FIG. 1.

In FIGS. 1 and 2, an example of a composed element 1 according to the invention is represented, in the form of a piece of furniture, more particularly a cabinet, which substantially is composed of panel-shaped elements connected to each other at an angle. The panel-shaped elements generally have the reference number 2, however, for distinction, are indicated by 2A, 2B, 2C and 2D, wherein, in the example, these form the right side wall 3, the bottom wall 4, the left side wall 5 and the top wall 6. Further, this piece of furniture comprises a skirting board 7, a back part 8 and two shelves 9-10.

As becomes clear from the different views of the FIGS. 2 to 6, the respective panel-shaped elements 2 comprise coupling zones 11-12 in which coupling parts 13-14 are present in the form of a profile respectively extending in the longitudinal direction of the respective coupling zone, wherein these profiles allow that each time two panel-shaped elements 2 can be coupled to each other in a locking manner and at an angle. In the represented example, herein use is made of coupling parts 13-14 with profiles in the form of a split tongue 15, which cooperates with a groove 16. Such type of corner connections with coupling parts, which as such make use of a split tongue and a groove, are known as such already from DE 20 2009 008 825 U1.

More particularly, the coupling parts 13-14 substantially are realized as profiles in the form of a tongue 15 and a groove 16, which comprise locking means 17-18, which, in the coupled condition, counteract the moving apart of the tongue 15 and groove 16, more particularly prevent it. As represented, these locking parts 17-18 preferably are realized as ribs or edges, which form part of said profiles.

Figure 3:
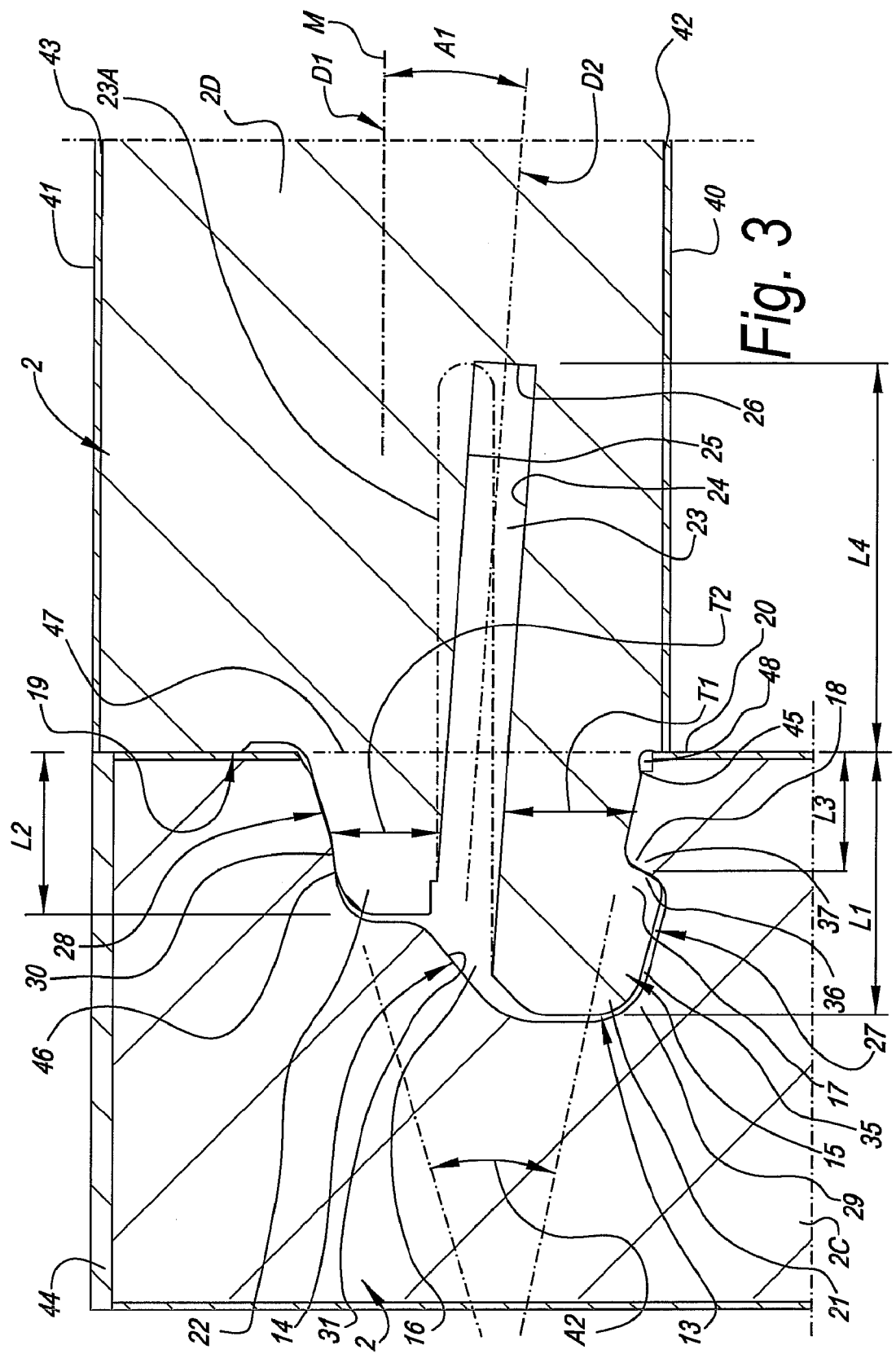
FIG. 3, at a larger scale, represents the part indicated by F3 in FIG. 2.

As represented, it is represented herein that the tongue 15 respectively is situated on a distal end 19 of the respective panel-shaped element 2, more particularly 2D in FIG. 3, whereas the groove 16 is situated in the lateral face 20 of the other panel-shaped element 2, more particularly 2C in FIG. 3, in other words, in one of the large surfaces thereof. In the example, the coupling zone 11 then is formed by the small end edge of the respective panel-shaped element on which the tongue is situated. The coupling zone 12 then respectively consists of a zone of the other panel-shaped element against which said small end edge of such panel-shaped edge adjoins.

The tongue 15 consists of a split tongue, with thus at least two parts 21-22 and a slit 23 situated there between. The slit is bordered by sides 24 and 25, which are situated respectively on the parts 21 and 22, as well as by a bottom 26. Said two parts 21 and 22, which herein below are denominated first part 21 and second part 21, respectively, in the represented example have a different length, L1 and L2, respectively.

It is noted that according to not represented variants, the tongue may also consist of more than two parts, for example, when an extra material part should be present parallel in the slit. The previously intended slit then, so to say, is divided into two slits.

The outer sides 27-28 of the parts 21-22 represented in the figures cooperate with the side walls 29-30 of the groove 16. Further, the groove 16 has a bottom wall 31. As represented, this bottom wall in respect to shape preferably is adapted to the different lengths L1 and L2 and thus shows a deeper part 32 and a less deep part 33, by which extra material 34 is retained at the location of the less deep part 33. Retaining such material part 34 is less important for T-connections, however, is indeed of importance with single-fold corner connections in order to keep in this manner a more stable whole and to avoid the risk of a lateral breaking off of the material bordering the groove. Therefore, it is preferred that the parts 32 and 33 of the bottom wall 31 in the coupled condition preferably remain not more than 2 mm removed from the farthest distal ends of the parts 21 and 22, in other words, follow the global shape of the tongue 15.

In the side wall 29, a recess 35 is formed, such that the part situated in front of it functions as locking part 18. The locking parts 17 and 18 define cooperating locking surfaces 36-37.

The locking part 17 is situated on said first part 21 of the tongue.

It is noted that the first part 21, as represented in the figures, is provided with said locking part 17, whereas the second part 22, as represented, preferably is free from a locking part. Such composition allows that the tongue, as represented in FIG. 5, can be turned easily into the groove, with a turning movement W, without generating large forces in the coupling parts. However, the invention does not exclude that a locking part is also present on the second part 22, which preferably then is less pronounced than the locking part 17. Such less pronounced or thus smaller locking part is represented as an example in dashed line in FIG. 4 and indicated by reference number 38, wherein this locking part is realized as a local protrusion, which can cooperate with a recess 39, which also is illustrated in dashed line.

In accordance with the invention, the slit 23, seen in cross-section of the tongue 15, comprises at least one side, of which the course, seen in cross-section, deviates from the main direction D1 pertaining to the tongue, and preferably extends at an angle in respect to said main direction D1. In the represented example, even both sides 24 and 25 are realized inclined, in the example parallel to each other, such that the slit 23 in the tongue, globally seen, extends inclined in respect to said main direction.

Herein, the side 24, which borders the first part 21 of the tongue 15, globally seen extends in such a direction inclined in respect to said main direction D1 that this side 24, from the distal end of the slit 23 to the proximal end, approaches the surface 40 which is situated on the same side as the first part 21 of the split tongue, in other words, in such a direction inclined that the first part 21 and/or the part of the panel-shaped element on which the first part 21 is provided, globally becomes thinner towards the proximal end, in comparison to embodiments wherein the slit would not be inclined. It is clear that hereby, the first part 21 is elastically displaceable in a relative smooth manner.

The side 25 of the slit 23 which borders the second part 22, globally seen extends inclined in respect to said main direction D1, such that this side, from the distal end of the slit towards the proximal end, becomes distant from the surface 41 which is situated on the same side as the second part 22, or, in other words, this side 25 extends away in an inclined manner in the same direction as the side 24. In the represented example, this contributes to that the base of the first part 22 becomes more solid and stable.

Herein, the whole is designed such that the first part 21, and in particular the locking part 17 thereof, is elastically displaceable in a smoother manner than the second part 22, which latter rather is rigid. The smooth elastic displacement of the locking part 17 is obtained in that the first part 21 as such is longer than the second part 22, but even more in that the first part 21 adjoins to and is carried by a thin material part, cut free by means of the slit 23, of the panel-shaped element 2D, namely, the part of the actual panel-shaped element situated between the side 24 of the slit and the surface 40. In that the side 24 extends inclined in the represented direction, a relatively thin material part is retained next to the most inwardly situated end of the slit, which moreover is situated at a relatively large distance of the locking part, which promotes a smooth elastic bending at the height of this material part.

It is clear that by the "slit" both the part has to be understood which divides the tongue and the deeper extension thereof in the panel-shaped element.

The global direction of the side 24 and/or the global or average direction D2 of the slit 23 in the example deviate from the main direction D1 over an angle indicated by A1. The size of this angle preferably is situated between 2 and 20 degrees. With a coupling having a normal strength, preferably angles A1 between 2 and 8 degrees will be used, and preferably in the order of magnitude of 4 degrees. When a less stiff coupling is desired, in other words, a coupling which can be smoothly snapped together, preferably use will be made of angles A1 of 8 to 20 degrees.

In the represented example, the tongue 15 is situated at the small face of the respective panel-shaped element. Herein, by the main direction D1 belonging to the tongue, the direction has to be understood of the plane in which the panel-shaped element 2D is located.

As represented, the tongue 15 is situated eccentrically in respect to the center plane M of the panel-shaped element on which it is situated, wherein the composed element 1, at least at the side towards which the tongue is eccentrically displaced, forms an inner corner between the panel-shaped elements. More particularly, the tongue, globally seen, is situated out of the center of the panel-shaped element 1 in such a manner that it is situated closer to the side located against the inner corner 22 than to the opposite side.

The tongue 15 is fitting into the groove 16 by means of a turning movement W, such as illustrated in FIG. 5, wherein the turned-in panel-shaped element, in this case 2B, in right-angled condition, obtains its end position. The turning movement W takes place along the side of the inner corner of the represented composed element. Releasing both panel-shaped elements either takes place by a turning movement in opposite direction, or by pulling or tapping the panel-shaped elements out of each other in a direction parallel to the tongue.

Figure 4:
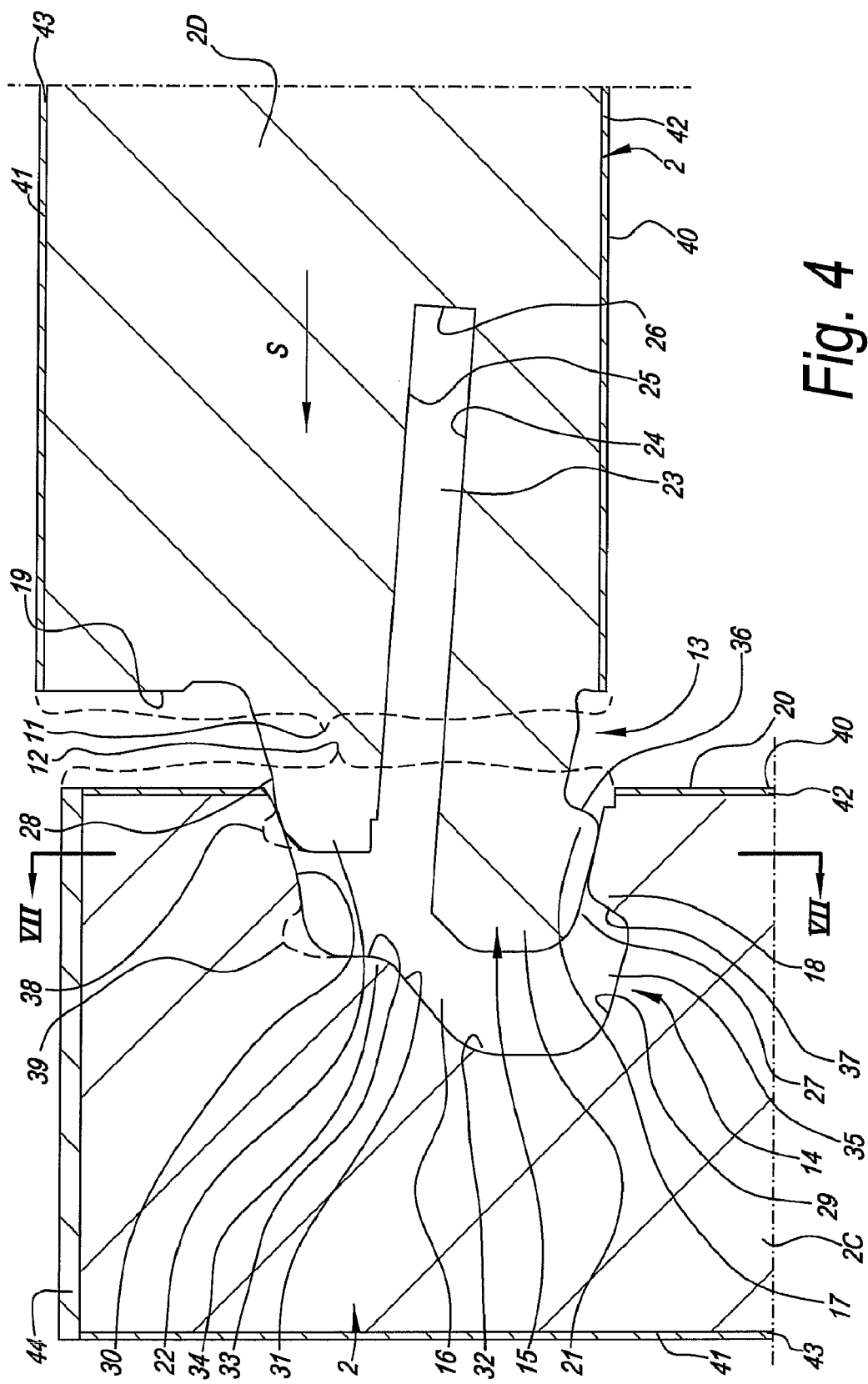
FIGS. 4 and 5 show two manners of realizing the connection of FIG. 3.
Figure 5:
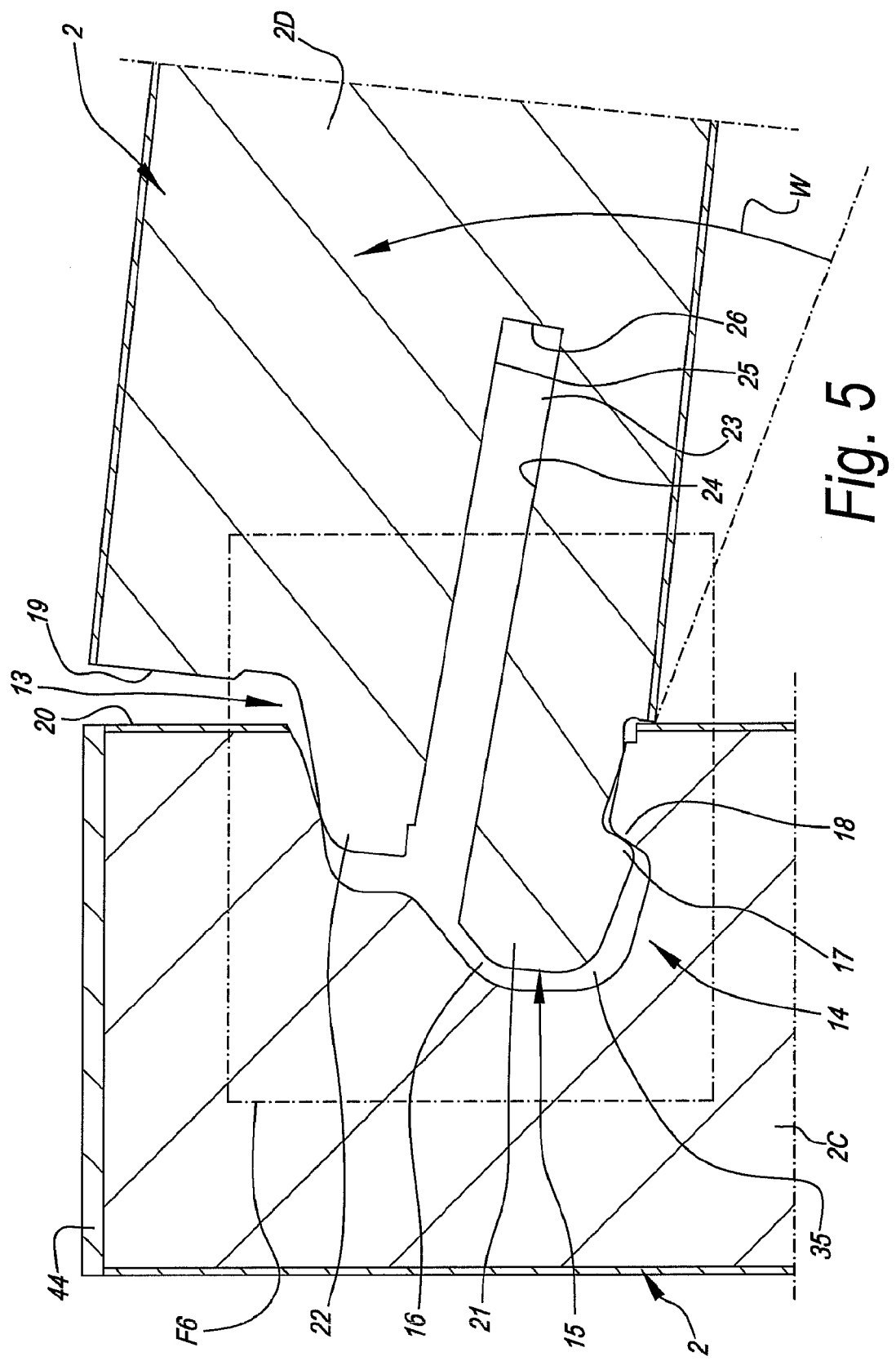

It is noted that the panel-shaped elements can also be joined together by means of a snap movement, by displacing the panel-shaped elements by means of a mutual translation movement S, as illustrated in FIG. 4.

Herein, the tongue 15 fits into the groove 16 by means of a snap movement, such by pressing the respective panel-shaped element with the tongue 15 in its plane towards the groove 16. In the represented embodiment, this is achieved in that the locking part 17 can perform a lateral elastic movement, possibly in combination with a slight elastic compression in the material of the two locking parts 17-18, and this locking part 17 in this manner can engage behind the locking part 18, this all whether or not combined with some more compression in the material of tongue and groove.

Preferably, the slit 23 has a width which is equal to or larger than the maximum lateral displacement performed by the locking element 17 in respect to the panel-shaped element, to which it belongs, during the snapping together.

Further, the entrance of the groove 16 has a small insertion angle A2, which preferably is smaller than 40 degrees and still better is in the order of magnitude of 30 degrees.

Globally seen, the tongue is made conical, with conical sides formed by the outer side of the second part 22 and the outer side of the locking part of the first part 21.

It is clear that the examples represented in the figures represent a tongue 15 and a groove 16 which are configured such that they can be brought into each other by means of a snap movement via a translation, as well as by means of a turning movement, thus, in two manners, such at choice of the installing person. This becomes clear from FIGS. 4 and 5, which respectively show the two coupling techniques for the same form of tongue and groove.

As represented, the tongue 15 and the groove 16 preferably are realized in one piece in the panel-shaped elements, for example, by means of milling treatments.

Herein, the tongue 15 is situated on the small face of the respective panel-shaped element, whereas the groove is provided in the side of the respective panel-shaped element.

As represented in the figures, the panel-shaped elements preferably are formed of a covered board, with preferably on both sides a covering layer, 42 and 43, respectively. This preferably relates to a melaminated board, thus, a board which is provided with a laminate covering. In particular, the laminate layer shall consist at least of a decor layer provided with resin and pressed on the board, whether or not in combination with other layers. Examples hereof are HPL (High Pressure Laminate) or DPL (Direct Pressure Laminate). Also, a film, lacquer layer or the like can be applied, or any other form of covering.

The basic board itself preferably consists of MDF, HDF or particle board. Although particle board often is not as stable as MDF or HDF and will crumble away more easily, particle board is preferred for furniture, in consideration that it is more light-weight, which is even more important when, for esthetical reasons, it is chosen for working with relatively thick walls, for example, with a thickness of 18 mm or more. The present invention contributes to that such profiles can also be performed in particle board material in an efficient manner.

Figure 7:
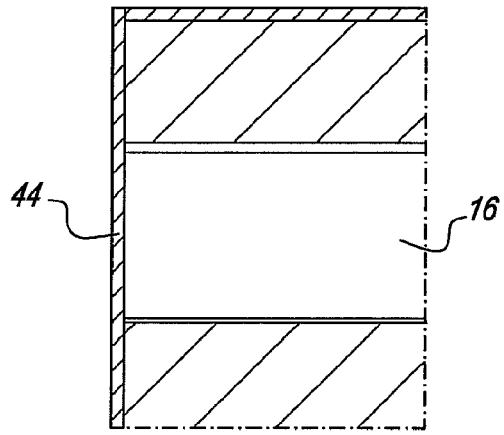
FIG. 7 represents a cross-section according to line VII-VII in FIG. 4, exclusively of the panel comprising the groove.

On the edges, the panel-shaped elements can be provided with a finishing tape 44, for example, a laminate tape or a finishing tape of synthetic material, for example, an ABS tape. FIGS. 1 and 7 also show that the ends of the tongues and grooves can be hidden from view by means of such finishing tape, by letting such finishing tape continue over the distal ends of the groove 16, in other words, by providing for a straight tape covering, in such a manner as described in DE 20 2009 008 825 U1. Such tape covering is performed at the manufacturer's.

In accordance with said second aspect of the invention, in the represented example also a particular distribution of support points 45-46 is applied, such in combination with a slit 23 which extends at least deeper than the protruding parts of the tongue, in other words, to beyond the closing plane 47. Herein, the first contact point is defined as being the contact, situated closest to the closing plane 47, between the groove and the first part 21 of the tongue 15, whereas the second contact point 46 is defined as being the contact, situated most distant from the closing plane 47, between the groove and the second part 22 of the tongue. The particularity consists in that the first contact point 45 is situated closer to the closing plane 47 than the second contact point 46. Hereby, on the one hand, a better force distribution is obtained for forces in the coupling. Also, it is obtained that in intermediate positions when assembling a piece of furniture, wherein one panel-shaped element is put down with the groove 16 upwards, whereas another panel-shaped element is provided therein directed with the tongue 15 downwards, it is obtained that this second panel is not so fast inclined to fold down, even if one lets it go.

It is noted that in the coupled condition, the closing plane 47 usually consists of the plane coinciding with the panel surface 40 in which the groove 16 ends.

As represented, on the entrance of the groove 16, at the side from which the tongue is turned into the groove, a preferably angular cut-out 48 can be realized on the edge 49, which allows a smoother turning-in.

The embodiment represented in the figures also applies the third independent aspect of the invention. In connection therewith, the lengths of the first part 21 and the second part 22 of the tongue 15 are indicated with L1 and L2, respectively, whereas the distance by which the center of the closing plane 37 is situated within the surface of the respective board is indicated by L3. In accordance with the third aspect, the tongue 15 is slit and a locking part 17 is present on the outer side of the first part 21, whereas on the outer side of the second part, a less pronounced and preferably even no locking part is present. Still in accordance with the characteristics of the third aspect, the second part 22 of the tongue 15 protrudes with a length L2 out of the closing plane 47, which is smaller than 0.75 times the length L1 by which the first part 21 of the tongue 15 protrudes out of the closing plane 47. By respecting this ratio, the advantage is obtained that the tongue, on the one hand, can be smoothly turned in, as the second part, relatively seen, does not hinder too much, whereas on the first part indeed such engagement and locking can be realized. Also, the less deeply situated part of the bottom wall of the groove proportionally then can be performed even less deep, by which the wall of the groove becomes particularly sturdy.

The represented embodiment also illustrates the fourth independent aspect of the invention, amongst others, in that the slit 23 reaches so deep that it extends to beyond the closing plane 47, and further in that the second part 22 of the tongue 15 protrudes with a length L2 out of the closing plane 47 which is smaller than 1.5 times the average distance L3 by which the locking surfaces 36-37 are situated from the closing plane. Hereby, it is obtained that the distance by which the second part 22 protrudes, is restricted in respect to the location where the first part 21 engages. By this restriction, it is excluded that a part 22 protruding too far will be experienced as inconvenient during coupling. In order to guarantee a stable coupling, the length L2 preferably then is larger than L3.

In that the represented embodiment, amongst others, also shows the characteristic that the part of the first part 21 which extends between the closing plane 47 and the locking surfaces 36-37, shows an average thickness which is larger than the average thickness T2 of the second part 22, this embodiment also forms an example of the fifth aspect of the invention. It is clear that by such proportion, starting from the same overall thickness of the tongue 15, it is obtained that the first part 21 becomes more solid and stable, which is important in view of the fast that it carries the locking part and thus is considerably loaded in respect to forces. It is clear that the fifth aspect is particularly advantageous with embodiments where, as represented, the tongue is placed eccentrically and the slit extends deeper into the panel-shaped element than the base of the tongue. Hereby, it is thus obtained that, although the first part as such is more stable and solid, still a considerable elastic movability can be created, in that the first part 21 then, so to speak, is extended by the cut-out material part of the panel-shaped element to which the first part 21 adjoins.

It is noted that T1 preferably is the average thickness of the part which extends over the distance L1 and/or the thickness thereof measured halfway the length L, whereas T2 is the average thickness of the second part 22 and/or the thickness thereof measured halfway the length L2. Both possibilities can be applied, depending on the criteria the manufacturer wants to use.

In accordance with the sixth aspect the depth, in other words, the distance L4, with which slit 23 reaches from the closing plane 47 inwards into the panel-shaped element 2, is larger than the largest distance L1 with which tongue 15 reaches out of the closing plane. It is clear that this is beneficial to the movability of the first part 21. Moreover, the occurring deformations thereby can be transferred more towards the back, such that the tip of the first part 21 is less loaded in respect to deformations at the location of the locking part.

According to the seventh aspect mentioned in the introduction, the tongue and the groove have such configuration that when turning into each other, towards the end of the turning-in movement, a force peak has to be overcome, such that also when turning out of each other again, a force has to be overcome, such with a turning movement wherein contact is held next to the edge 49, as indicated by contact points 50 and 51 in FIG. 6. In this manner, it is obtained that holding means or blocking means are integrated in the coupling itself, which then provide at least for a deceleration effect which counteracts the turning out of each other of the tongue and groove and, thus, of the panel-shaped elements. This then is also useful during assembly, in order to prevent, as aforementioned, that in certain intermediate positions during the assembly of a piece of furniture, one panel-shaped element, which then temporarily is provided upright in another, will fold down in respect to the other.

As illustrated in FIG. 6, this can be realized by providing, on the tongue at the side thereof where no locking part is present, a part 52 which, during the turning into or out of each other, theoretically overlaps with a part 53 on the groove, such that a force, more particularly a deformation force, at a dead point has to be overcome.

According to an alternative, which also is represented in FIG. 6, the tongue and groove, at the height of the locking parts, can comprise parts which, by a theoretical overlap 36A, during turning provide for that a deformation force has to be overcome at a dead point.

It is clear that both possibilities may or may not be combined.

Also, the profiles can be performed such that in the coupled condition, a tension force remains, in particular a so-called pretension.

It is clear that said coupling can be applied on various locations on a composed element, such as a piece of furniture, for realizing a corner connection, either a usual corner connection or a T-connection, or even cross-shaped connection. However, this does not mean that all corner connections of such composed element have to be realized as such.

It is noted that the invention in particular aims at embodiments wherein the tongue as such provides for the coupling effect, and wherein thus the tongue remains free from external elements which, during coupling, effect on the tongue, such as a wedge or the like, which is driven into the slit of the tongue, for example, as known, amongst others, from U.S. Pat. No. 7,654,055. In fact, the tongue as such can comprise elements which belong fixedly to the tongue and which can support the coupling force supplied by the tongue, such as, for example, an elastic strip or mass which is provided in the slit of the tongue.

Further, it is noted that, where applicable, the invention is not limited to corner connections which, in the assembled usage condition, extend in horizontal directions, however, may also be applied for corner connections which extend in other directions, for example, the vertical direction. An example of a connection extending in vertical direction, by which is meant that the coupling zones extend in vertical direction, is obtained, for example, when two side walls of a cabinet are connected to a back wall by means of a corner connection of the present invention, analogous as illustrated in FIGS. 54-55 of the aforementioned DE 20 2009 008 825 U1.

It is noted that by the term "coupling zone" applied herein above, the part of a panel-shaped element has to be understood in which said profile, for example, groove profile or tongue profile, extends. Herein, this may relates to an edge zone, thus, a zone situated on or in the direct proximity of an edge of the panel-shaped element, as well as a zone which clearly is remote from the edge of a panel-shaped element, for example, when this zone is intended for forming a T-coupling between panel-shaped elements.

It is also noted that according to the invention, by a "composed element" an element has to be understood in "composed" as well as in "still to be composed" condition. This then also means, for example, that a not yet assembled and still packaged flat-pack piece of furniture, which in the assembled condition shows one or more characteristics of the invention, also already has to be considered a "composed element".

When use is made of an "intermediate piece", this is an element which applied on a corner between two panel-shaped elements, wherein the respective coupling then takes place between at least one of the panel-shaped elements and the intermediate piece. An example of the use of an intermediate piece is represented, for example, in FIG. 64 of WO 2010/070605.

When it is stated that a side of the slit has a deviating course, by this in fact an essential part of the side of the slit is meant and thus, for example, no rounded part, inclined part or the like at the beginning or end of the slit.

It is noted that by a "locking surface" possibly also a line contact can be understood.

By a side which extends deviating from the main direction D1, also a side can be understood which has a stair-shaped course. Also, for example, the side 24 may run parallel to the direction D1 over the major part, in order to bend off only next to the deepest end of the slit towards the surface 40.

It is self-evident that embodiments according to the second to the seventh aspect do not necessarily have to possess a tongue 15 with an inclined-running slit 23. In such case, the slit, for example, may also run parallel to the respective main direction D1, for example, as indicated by dashed line 23A in FIG. 3.

Figure 8:
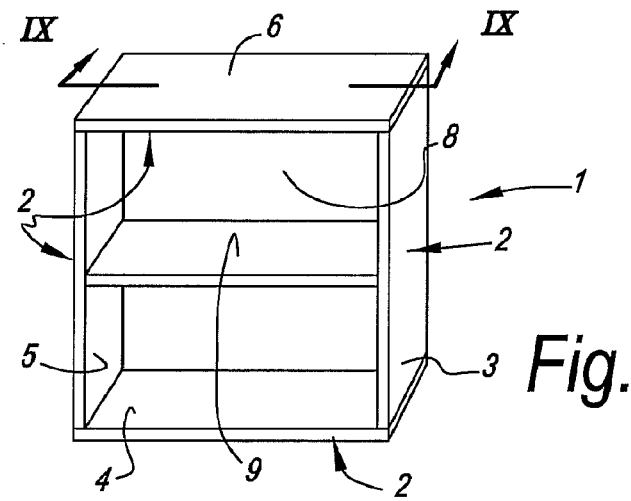
FIG. 8 represents another composed element according to the invention.
Figure 9:
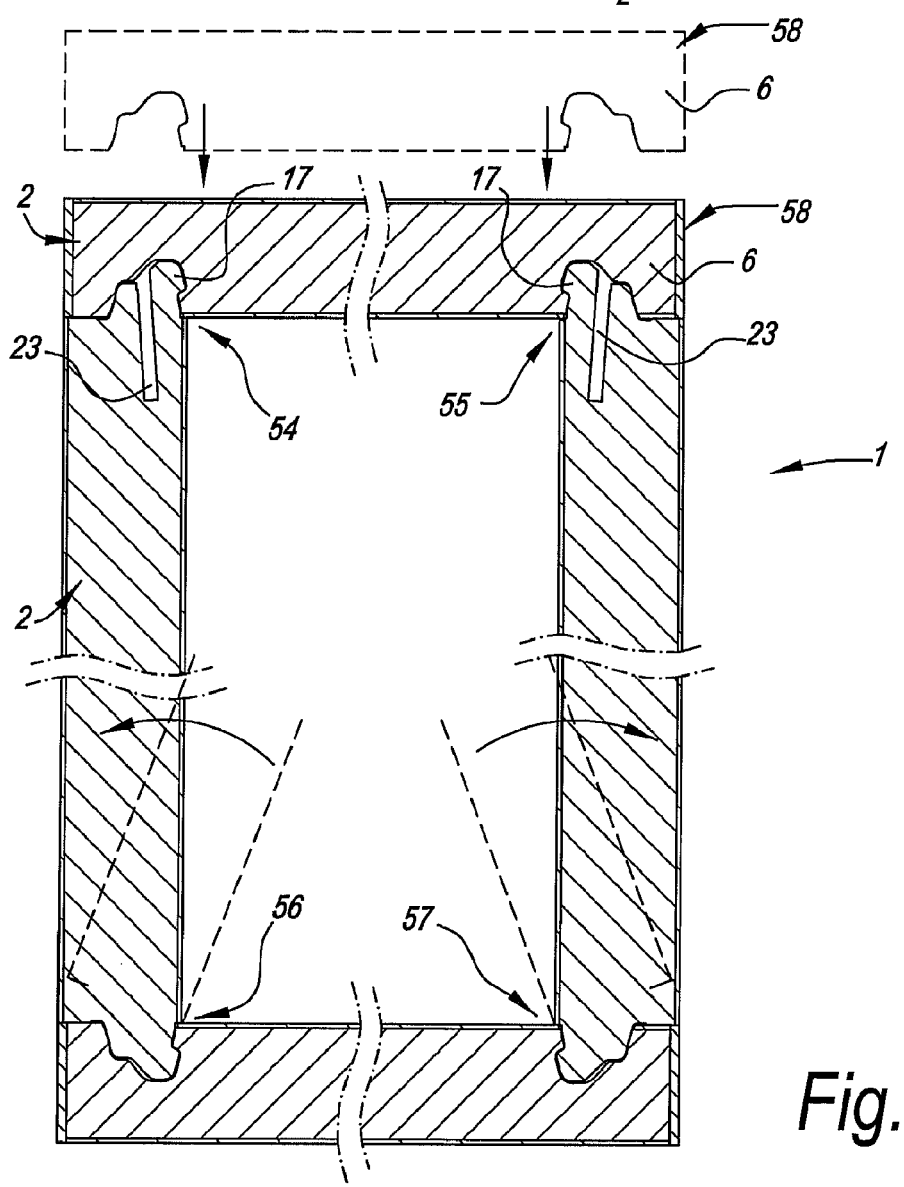
FIG. 9, at a larger scale, represents a cross-section according to line IX-IX in FIG. 8.

In FIGS. 8 and 9, the first possibility of the eighth aspect mentioned in the introduction is illustrated. The represented composed element 1 thus comprises at least three, and in this case even more than three, panel-shaped elements 2, which can be coupled to each other by means of corner connections 54-55 and 56-57. Herein, the composed element comprises corner connections with coupling parts, which provide for locking tongue and groove connections. These corner connections, one the one hand, 54-55, and on the other hand, 56-57, differ from each other in that such "first" corner connection 54-55 comprises coupling parts which can be joined together at least by means of a snap-insert-movement, whereas such "second" corner connection 56-57 comprises coupling parts 56-57 which can be joined together exclusively by a turning movement. Herein, it is noted that both the "first" corner connections 54-55 as well as the "second" corner connections allow that the respective tongue and groove can be joined together by means of a turning movement. In FIG. 9, said difference is realized by applying a split tongue 15 at each first corner connection 54-55 and applying a full tongue 15 at each second corner connection 56-57.

Figure 10:
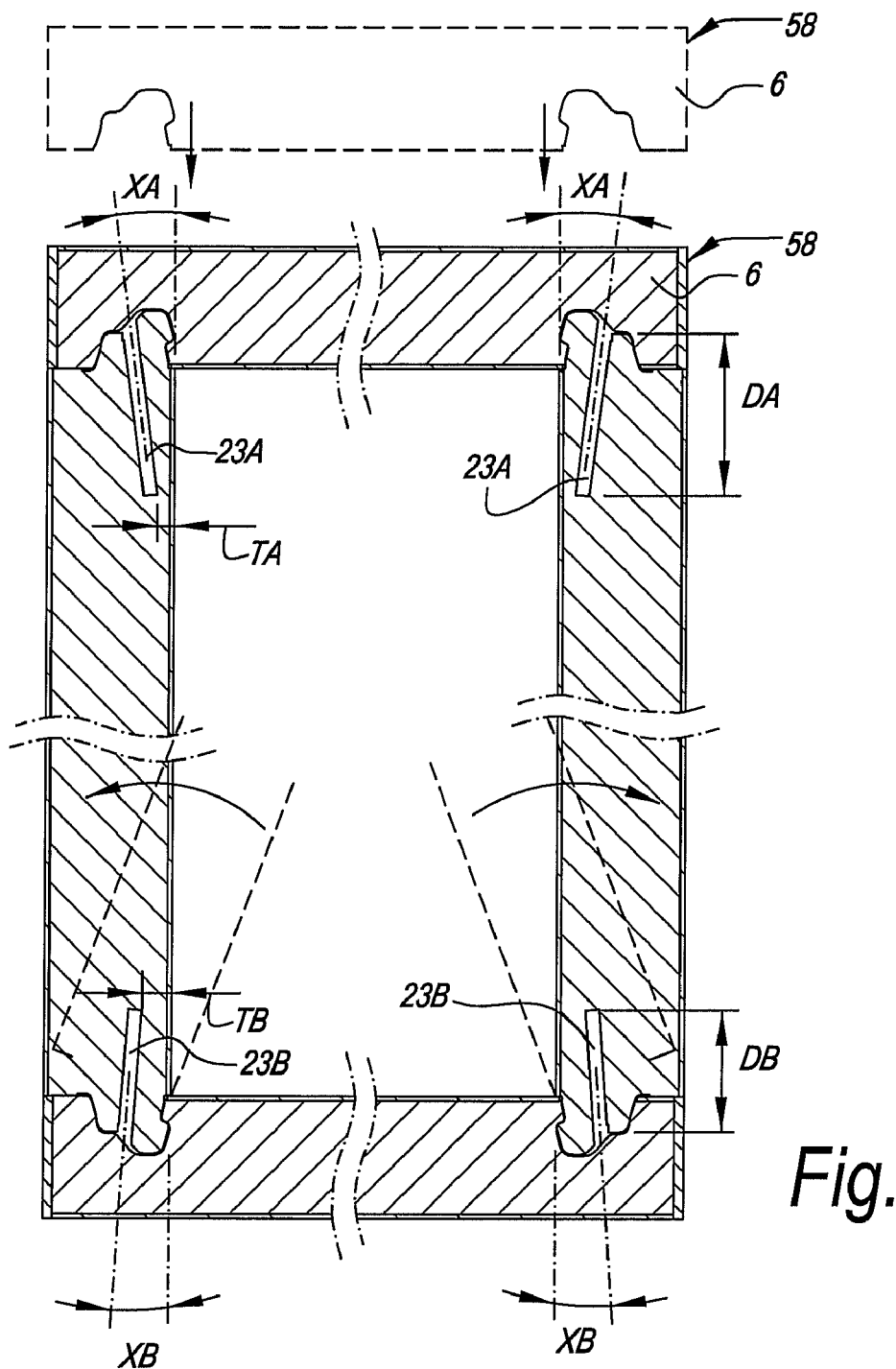
FIG. 10 represents a view analogous to that of FIG. 9, however, for a variant.

In FIG. 10, the second possibility is represented, wherein both corner connections, on the one hand, 54-55, and on the other hand, 56-57, have a split tongue and the aforementioned difference is realized at least, and preferably substantially, by performing these split tongues 15 different from each other, and more particularly by a difference in the configuration of the slits 23A-23B of the split tongues 15.

In the example of FIG. 10, the difference is realized by the combination of the following characteristics:
the slits 23A-23B of the two different corner connections, thus, on the one hand, on the top and, on the other hand, at the bottom, are performed such that the thinnest material parts between each time the respective slit and the closest side wall show a different thickness TA-TB, wherein in this case TA is smaller than TB;
the slits 23A-23B of the of the two different corner connections, thus, on the one hand, on the top and, on the other hand, at the bottom, are performed such that the one slit 23A extends deeper than the other slit 23B, in other words, have different depths DA-DB, wherein in this case DA is larger than DB;
the slits 23A-23B of the two different corner connections, thus, on the one hand, on the top and, on the other hand, at the bottom, are performed such that the slits 23A-23B extend at different angles XA-XB in respect to the panel-shaped elements.

It is clear that as a consequence thereof, the uppermost corner connections of FIG. 10 can be snapped into each other less stiffly than the ones at the bottom.

In the examples of FIGS. 9 and 10, the split tongues of both corner connections are of the type wherein the tongue on only one side has a locking part 17, more particularly on the part of the tongue which is most movable.

FIGS. 8, 9 and 10 also illustrate the characteristic that at least one of the panel-shaped elements, in this case the upper wall 6, functions as a closing piece 58 which, by at least two corner connections 54-55, is coupled to other panel-shaped elements by means of snap-insert-movements, wherein these two corner connections are performed as such "first" corner connections, whereas a number of other corner connections 56-57 in the composed element, in this case the remaining lowermost corner connections, are realized as such "second" corner connections. It is clear that, in the represented examples, this offers the advantage that thereby, the corner connections at the bottom can be performed particularly sturdy, whereas those at the top allow a smooth snap action.

It is noted that the above also applies for T-shaped corner connections.

Figure 13:
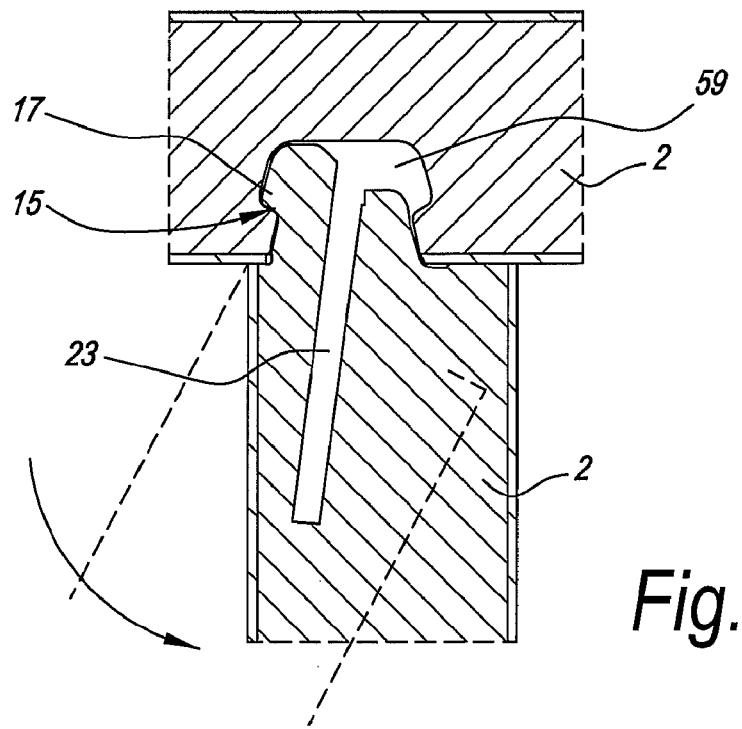
FIG. 13 represents a view similar to that of FIG. 11, however, in coupled condition.
Figure 14:
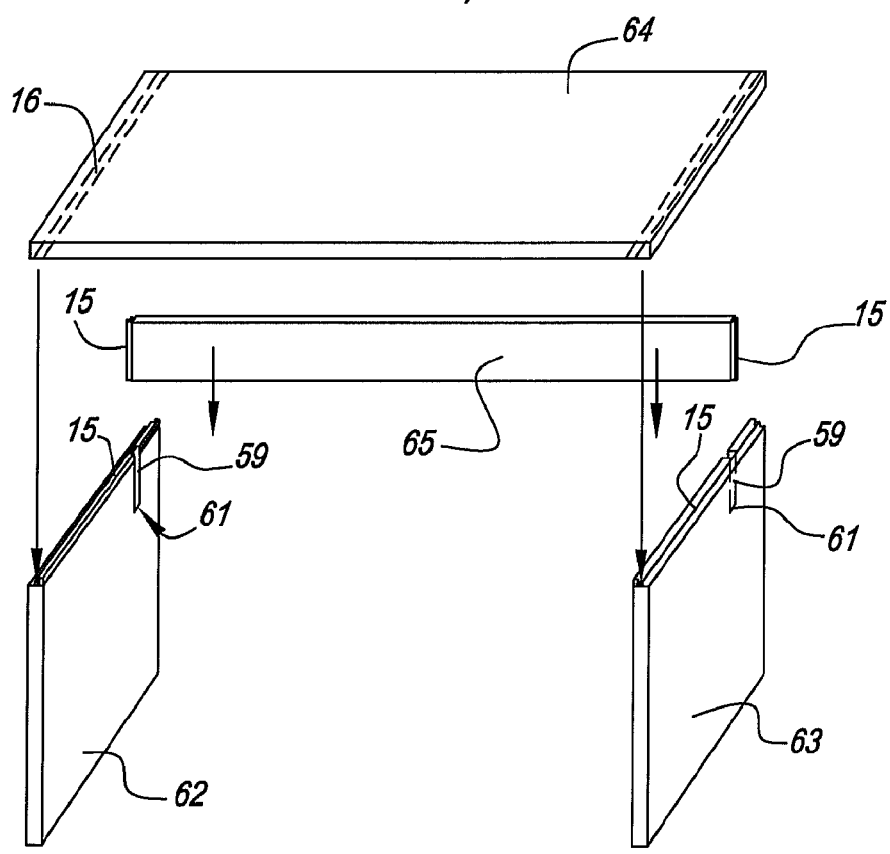
FIG. 14 represents a composed element in the form of a piece of office furniture in which two connections such as those from FIG. 13 are applied.

FIGS. 11 to 13 illustrate the ninth aspect of the invention. As set forth in the introduction, herein use is made of a groove 59 which, seen in cross-section, substantially and preferably is completely symmetrical. As schematically represented in FIG. 12, the groove can be formed by a finger milling cutter 60.

An advantage of this technique is that it can be applied for applications wherein the groove 59 cannot be made continuously and, at least at one end 61, has to end in the material of the respective panel-shaped element, such as, for example, in the piece of office furniture described herein below.

The represented piece of office furniture comprises side panels 62-63, a top 64 and an intermediate part 65 intended for forming a connection between the side panels 62-63 in order to hold these parallel. All component parts of the piece of furniture are assembled to a whole by locking profiles only. During assembly, the side panels 62-63 and the intermediate part 65 are joined together by means of turning movements, wherein the tongues 15 situated on the ends of the intermediate part 65 are turned into the symmetric grooves 59 located on the inner sides of the side panels 62 and 63. When this whole is standing upright, the top 64 simply can be pressed down on the upper edges of the side panels 62-63, with the grooves 16 over the tongues 15.

The ninth aspect is also useful with drawers wherein one or more of the upright walls are put together by locking profiles. Herein, in certain applications it is in fact recommended that the grooves are not made continuously, and in such case symmetric grooves 59 can be applied, the end 61 of which can be situated at the desired location. A number of examples thereof will be described below.

Also in applications wherein such symmetrical groove is made continuous indeed, this can be of use. An advantage of such symmetrical groove, irrespective whether it is made continuous or not continuous, is that at least the contour, and even the entire groove, can be realized in a single milling cycle, which is cost-saving.

Another advantage consists in that irrespective whether the locking has to take place at the left hand side or the right hand side in the groove, this groove always is the same. As no different grooves are necessary, in certain applications the manipulations necessary for realizing locking grooves can be simplified considerably.

It is noted that the tongues which are applied in the eighth or ninth aspect, in the case that they are split tongues, always at choice can comprise one or more of the characteristics which are noted in this text in respect to split tongues.

FIGS. 15 to 19 represent a composed element 1, certain parts thereof, respectively, in the form of a drawer, wherein this composed element fulfills the tenth aspect of the invention. Herein, the composed element 1 comprises panel-shaped elements 2E-2F-2G-2H, which function as walls, respectively a first sidewall 66, a back wall 67, a second side wall 68 and a front wall 69 of the drawer to be formed, which walls, in the composed form of the element, form four corners, where the panel-shaped elements are connected to each other by corner connections 70-71-72-73. At the two rear corners, each time use is made of a corner connection 70, 71, respectively, which comprises a film hinge 74, whereas at the location of the foremost corners, use is made of corner connections 72-73 with mechanically locking coupling parts 13-14, more particularly a locking tongue and groove connection.

As can be seen in the enlarged representation of FIG. 17, such film hinge preferably is formed in that a continuous covering 75 is present on adjacent panel-shaped elements, in this case 2F-2g, whereas the panel-shaped elements for the rest are separated from each other by means of a suitable recess 76. Preferably, for the realization hereof, it is started from a board which is provided with a covering 75, in which then the necessary recesses 76 are provided, however, without cutting through the covering. This does not exclude that such film hinge 74 is formed in another manner, for example, by means of a foldable glue connection, for example, of a strip of hot-melt glue. It is also not excluded to form in the sides 77 and 78 of one or more of the recesses 76 also cooperating with each other coupling parts, such as fitting into each other or engaging in each other parts, which cooperate with each other as soon as the respective panel-shaped elements are turned towards each other along the respective film hinge.

The locking coupling parts 13-14 can be of any kind, however, preferably they are formed by a tongue 15 and a groove 16, with locking parts 17-18. More particularly, it is preferred that they are realized as described herein above, wherein then whether or not use is made of a slit 23 in the tongue, and wherein such slit, if it is applied, does not necessarily have to be inclined.

Thus, all components can be distributed in flat condition. For assembling the drawer, the panel-shaped elements 2E and 2G are brought from the condition of FIG. 15 into the condition of FIG. 16. Herein, a bottom 79 can be taken up between the walls 66-67-68 in grooves provided for this purpose. Subsequently, the front wall 69 is snapped down with the grooves 14 on the tongues 13. In the rear side of the front wall 69, as represented in FIG. 18, preferably a groove 80 is present, which forms a seat for the foremost edge of the bottom.

In the represented example, the front wall 69 forms the visible front panel, by which this example also forms an application of the eleventh aspect. However, it is clear that according to a variant the wall 69 can function as a simple front wall, whereas then still a separate front panel is provided in front of it.

In FIGS. 20 and 21, a variant of the tenth aspect is represented, wherein all four walls 66-67-68-69 are connected to each other by means of film hinges, by which then the corner connections 70, 71 and 73 are formed, whereas the corner connection 72 is effected by means of locking coupling parts 13-14, which are situated next to the free ends of the walls 69 and 66. As represented in dashed line, an extra front panel can be provided against the front wall 69.

FIG. 22 represents another embodiment, wherein the front wall 69 realized as a front panel is connected directly to the side panels by means of at least one locking coupling, in this case even two locking couplings 82-83, by which this embodiment also fulfills the eleventh aspect of the invention.

Figure 23:
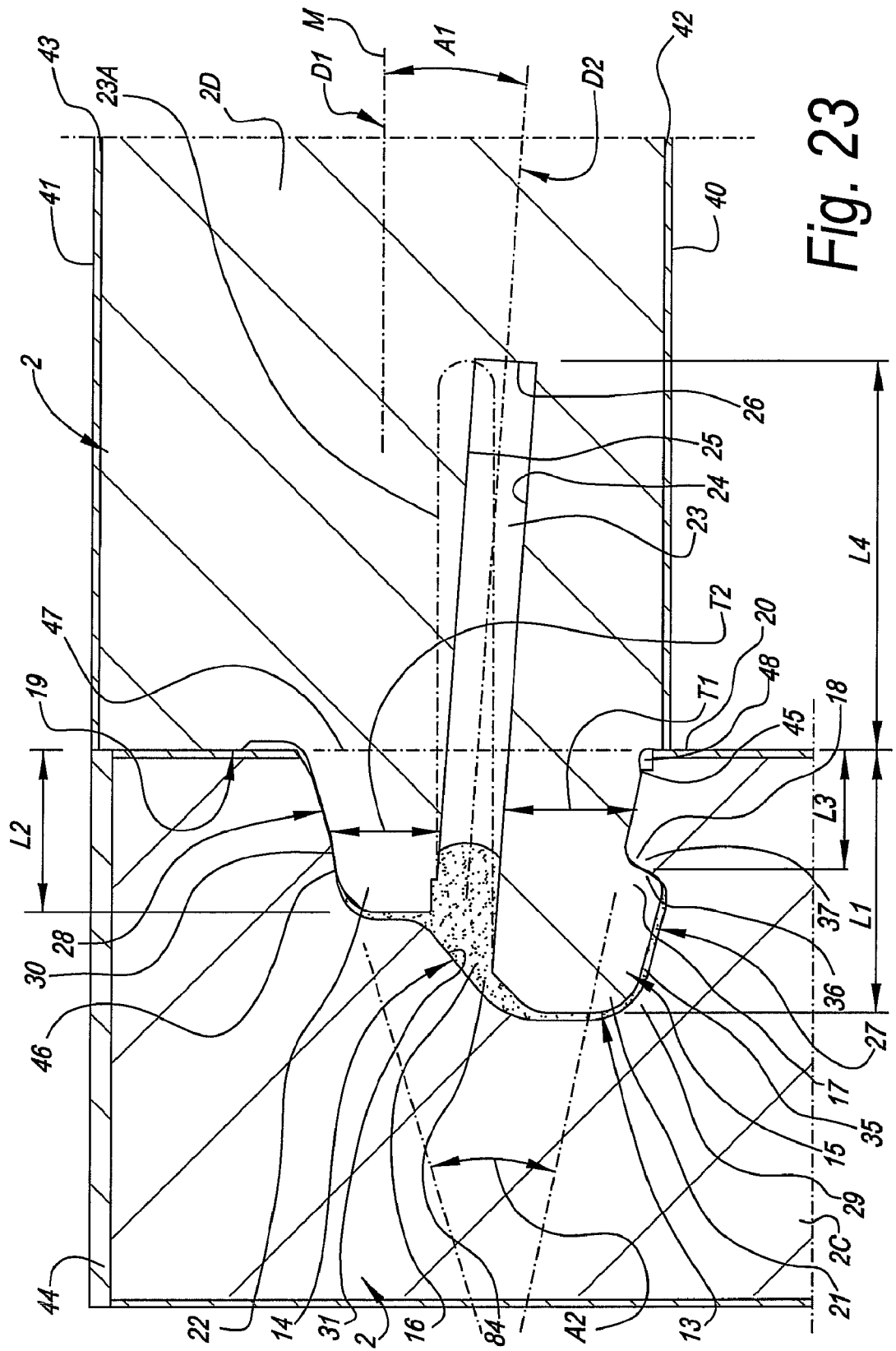
FIG. 23 represents a part of a composed element of the invention.

FIG. 23 illustrates the twelfth aspect of the invention. The particularity therein consists in that a corner connection is realized with locking coupling parts 13-14, this combined with a glue connection, in this case a glue connection by means of glue 84. In the represented example, the glue 84 has two functions. The first function is realizing an extra connection between the two panel-shaped elements in that glue is present between the tongue and the groove. The second function consists in fixing the two parts 21-22 in respect to each other by hardening the glue 84, in particular by the presence of glue in the slit 23, by which, after hardening of the glue, the parts 21 and 22 are difficult to move towards each other and finally a stronger coupling is obtained. It is clear that according to not represented variants, the glue can also be applied on such locations that only the first or only the second function is fulfilled.

Figure 28:
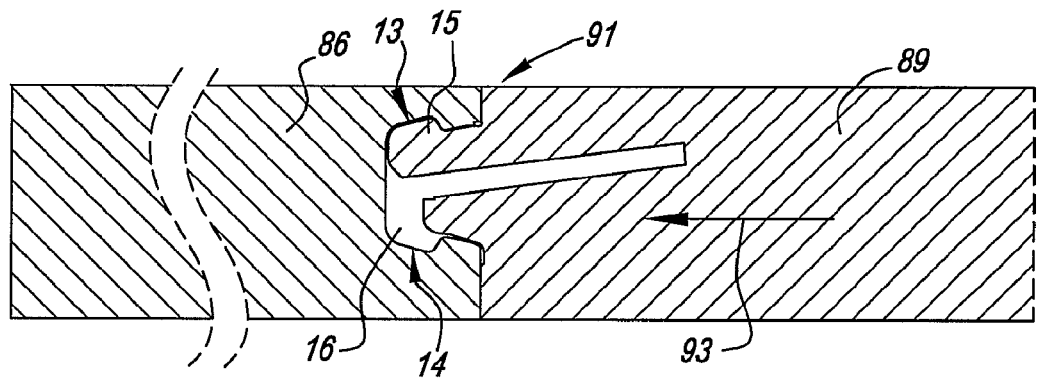
FIG. 28, at a still larger scale, represents a cross-section according to line XXVIII-XXVIII in FIG. 24.

FIGS. 24 to 28 relate to an embodiment of the thirteenth aspect of the invention, or at least to the embodiment of an essential component thereof. FIG. 24 principally represents a composed panel, for example, a panel of a cabinet, for example, a fixed panel thereof or a door panel thereof, with a frame 85 which is composed of frame panels 86-87-88-89 situated in the same plane. In the frame 85, there is a central panel 90, which is seated in rebates 91, such as grooves in the sides of the frame panels 86-87-88-89. The particularity herewith consists in that the frame panels can also be coupled to each other by means of locking couplings 92, as can be seen in FIG. 28. As can also be seen in FIG. 28, herein, for example, use can be made of the herein above-described locking coupling parts 13-14, however, other forms of coupling parts are not excluded. It is indeed important that this relates to coupling parts which can be pressed down in one another by means of a snap movement 93.

As schematically represented in FIGS. 24 to 27, the tongues 15 and grooves 16 preferably are locally present at the respective edges to be coupled, in other words, not over the complete length thereof, by which they are not visible at the exterior edge of the frame.

Figure 29:
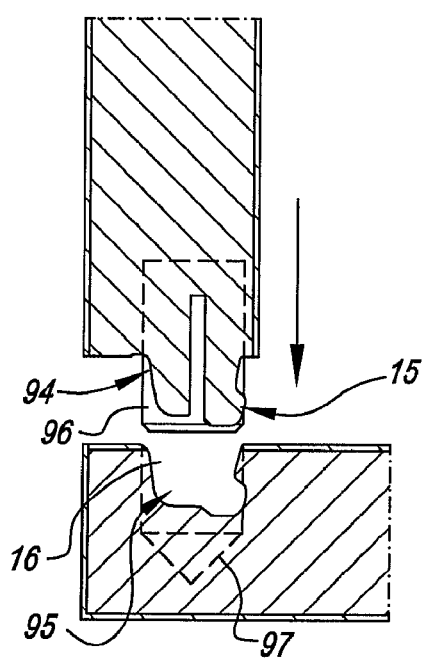
FIGS. 29 and 30 represent another two particular embodiments of corner connections, which can be applied according to the invention.
Figure 30:
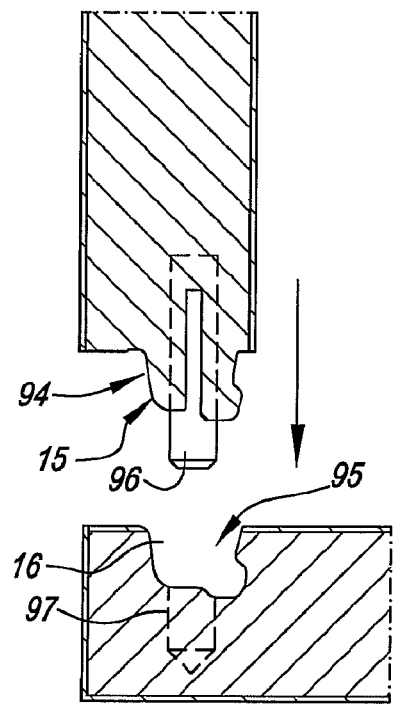

FIGS. 29 and 30 illustrate the fourteenth aspect of the invention. In this corner connection, use is made of profiles 94-95 with locking coupling parts comprising a tongue 15 and a groove 16; wherein the whole comprises auxiliary means which assist in a correct mutual assembly of the panel-shaped elements, which are formed by a three-dimensional form element in the form of a protrusion 96 which can cooperate with a corresponding recess 97; with the particularity that the protrusion 96, seen in the direction of a cross-section on the respective profile, extends entirely or for the major part through the profile 94 of the tongue, preferably in the form of a protruding plug, whereas the recess 97 is situated at the panel-shaped element comprising the groove 16, and preferably is realized in the form of a bore.

In FIG. 29, the protrusion 96 has a diameter which is somewhat larger than the thickness of the tongue, by which the panel-shaped elements exclusively can be joined together when the protrusion is situated opposite to the recess 97. In FIG. 30, the protrusion extends distally further than the tongue 15, with as a consequence that the panel-shaped elements in this case, too, can only be joined together when the protrusion is situated opposite to the recess 97. It is clear that the represented locations of the protrusion 96 in respect to the tongue 15, according to which the protrusions 96 are situated entirely or approximately entirely at the location of the tongue, offer the advantage that the panels do not have to be made especially thicker in order to integrate such protrusions. Vice versa, this also means that this form of integration is particularly suitable for being applied in thin panel-shaped elements, for example, which are thinner than 15 mm.

In the embodiments of FIGS. 29 and 30, such protrusion 96 and the pertaining recess 97 both have the same or approximately the same diameter. The belonging together panels-shaped elements then can also be joined together by a translation movement only. This does not exclude that the fourteenth aspect can also be applied with panels-shaped elements which can be joined together by means of another movement, for example, a turning movement. In order to allow, for example, in the embodiments of FIGS. 29 and 30 that the panel-shaped elements still can be turned into each other, the recesses 97 simply can be made somewhat wider in width, transverse to the groove, than the respectively pertaining protrusions 96, in such a manner that the respective protrusion 97 during turning in of the tongue into the groove also performs a tilting movement in the recess 97.

It is clear that by "mechanically locking coupling parts", coupling parts have to be understood which provide for that in the assembled condition a locking is effected wherein the panel-shaped elements in their normal assembled mutual condition thus cannot get apart from each other without overcoming a certain force.

All herein above-described characteristics, as well as characteristics of the profiles represented in the figures, thus, of the tongue profile and/or the groove profile, are applicable, each separately or in any possible combination, in combination with any of the fourteen independent aspects, inasmuch as such characteristic or the combination of characteristics is not contradictory to the main idea of such independent aspect. Some of these characteristics, which thus can be combined at choice, are, amongst others, by way of example:

the tongue comprises two parts 21-22, of which one part is shorter than the other, whether or not separated by a slit 23;

the tongue is provided with a slit 23;

the shape of the tongue and/or groove fulfills any of the dimensional proportions set forth in the description;

the tongue comprises a locking part 17 on one side only;

the tongue can be turned-in into the groove;

the tongue can be snapped into the groove by means of a translation movement;

the tongue is situated eccentrically;

the tongue is split and the slit runs inclined in respect to the plane of the panel-shaped element;

the tongue comprises two parts 21-22, of which one part is shorter than the other, whether or not separated by a slit 23, and a locking part 17 is present exclusively at the longest part 21.

Generally, it is noted that the coupling parts 13-14, preferably including the coupling parts 17-18, in all aforementioned aspects preferably are made in one piece of the material of the panel-shaped element. Herein, this may relate to any material. In most applications, however, use shall be made of wood-based panels, with a wood-based substrate, such as MDF, HDF or particle board.

The invention also relates to the individual components for realizing a composed element according to the invention, such as, for example, the side walls of a cabinet or drawer as such.

The present invention is in no way limited to the embodiments described by way of example and represented in the figures; on the contrary may such composed elements, and more particularly the parts thereof which provide for the realization of said aspects, be realized according to various variants without leaving the scope of the invention.

The invention claimed is:

1. A composed element comprising at least two panel-shaped elements coupled to each other at an angle by means of a locking tongue and groove connection either directly or indirectly by means of an intermediate piece, said connection including, at least on one of the panel-shaped elements, a tongue which cooperates with a longitudinally-extending groove provided on the other panel-shaped element or on the intermediate piece; wherein said tongue extends distally from an edge of the respective panel-shaped element; wherein the tongue defines a split tongue, with a first part and an opposing second part, each longitudinally extending along the edge of the panel-shaped element, and a slit located therebetween;
   wherein a laterally-protruding locking part is defined at an outer side of at least said first part, and a corresponding recess is defined in at least one inner side wall of the groove for receiving the at least one locking part, wherein said panel-shaped element comprising the tongue has a first surface and a second surface opposite the first surface, respectively defining first and second planes, the first surface being located on the same side of the panel-shaped element as the first part of the split tongue, and the second surface being located on the same side of the panel-shaped element as the second part of the split tongue;
   wherein the slit is defined between a first side of the slit and a second side of the slit opposite the first side, the first side bordering at least a portion of the first part of the tongue;
   wherein the slit extends deeper than a base of the tongue;
   wherein the first side of the slit, at least for a part of the slit reaching deeper than the base of the tongue and seen in a cross-section perpendicular to a lengthwise direction of the edge of the panel-shaped element comprising the tongue, has a directional course deviating from the first plane;
   wherein said directional course of said part of the slit, for a direction inwards of the slit, is such that the first side for said part of the slit approaches the first plane;
   wherein the tongue and groove define a profile such that they can be joined laterally by means of a displacement towards each other or by means of a turning movement; and
   wherein at least one of the outer sides of the tongue and/or the inner side walls of the groove comprises an inclined portion such that when the tongue is inserted into the groove by means of said displacement, the first and second parts compress towards each other, and subsequently expand to lock the locking part within the recess.

2. The composed element of claim 1, wherein the second part of the tongue is free from locking parts.

3. The composed element of claim 1, wherein the tongue and groove are arranged to be turned into each other, wherein the angle from which they can be turned into each other forms an inner corner, and that of both said parts of the tongue, the first part is situated closest to the inner corner.

4. The composed element of claim 3, wherein the tongue is situated eccentrically in the direction of the inner corner.

5. The composed element of claim 1, wherein the first part of the tongue protrudes farther than the second part of the tongue as measured from a common closing plane.

6. The composed element of claim 5, wherein a distance with which the slit extends from said base, said common closing plane, respectively, inwardly in the panel-shaped element is larger than the largest distance by which the tongue reaches up to outward of the common closing plane and/or outward of its base.

7. The composed element of claim 1, wherein the second side of the slit situated on the second part has a directional course deviating from the first plane.

8. The composed element of claim 7, wherein said second side towards inside in the slit substantially approaches the first plane.

9. The composed element of claim 1, wherein the first and second sides both substantially extend globally inclined, and seen in cross-section, are straight-lined over a major part of their length.

10. The composed element of claim 1, wherein the slit, globally seen, extends at an angle with parallel sides made by an incision.

11. The composed element of claim 1, wherein the tongue and the groove define a profile such that they can be brought into a mutually coupled condition by means of a turning movement as well as by means of a displacement towards each other, which displacement is combined with a snap action.

12. The composed element of claim 1, wherein the tongue is made in one piece with each respective panel-shaped element, and formed in the material itself, from a basic board with which the panel-shaped element is formed.

13. The composed element of claim 1, wherein the groove is situated in a lateral face of each respective panel-shaped element.

14. The composed element of claim 1, wherein the groove is made in one piece in each respective panel-shaped element, and formed in the material itself, from a basic board with which the panel-shaped element is formed.

15. The composed element of claim 1, wherein the panel-shaped elements, in respect to the material thereof, have one or more of the following characteristics:
   the panel-shaped elements substantially consist of a basic board which is a wood-based pressed board;
   the panel-shaped elements substantially consist of a basic board formed of MDF or HDF;
   the panel-shaped elements substantially consist of a basic board formed of particle board;
   the panel-shaped elements are formed of melaminated board;
   the panel-shaped elements comprise a light-weight board with borders of another material;
   the panel-shaped elements are designed as a hollow board, or as a board provided with hollow spaces with a honeycomb core, and with borders of another material.

* * * * *